(12) United States Patent
Herath et al.

(10) Patent No.: US 11,070,245 B1
(45) Date of Patent: Jul. 20, 2021

(54) SYSTEM AND METHOD FOR SINGLE-CARRIER MULTIPLE ACCESS TRANSMISSION

(71) Applicants: Sanjeewa Herath, Ottawa (CA); Monirosharieh Vameghestahbanati, Kanata (CA); Javad Abdoli, Kanata (CA)

(72) Inventors: Sanjeewa Herath, Ottawa (CA); Monirosharieh Vameghestahbanati, Kanata (CA); Javad Abdoli, Kanata (CA)

(73) Assignee: HUAWEI TECHNOLOGIES CO., LTD., Shenzhen (CN)

(\*) Notice: Subject to any disclaimer, the term of this patent is extended or adjusted under 35 U.S.C. 154(b) by 0 days.

(21) Appl. No.: 16/999,747

(22) Filed: Aug. 21, 2020

(51) Int. Cl.
| | |
|---|---|
| *H04B 1/707* | (2011.01) |
| *H04L 27/26* | (2006.01) |
| *H04B 1/02* | (2006.01) |

(52) U.S. Cl.
CPC ............ *H04B 1/707* (2013.01); *H04B 1/02* (2013.01); *H04L 27/2614* (2013.01); *H04L 27/2636* (2013.01)

(58) Field of Classification Search
CPC ....... H04B 1/707; H04B 1/02; H04L 27/2636; H04L 27/2614
See application file for complete search history.

(56) References Cited

U.S. PATENT DOCUMENTS

| | | | |
|---|---|---|---|
| 7,738,510 B2* | 6/2010 | Kwon | H04J 13/004 370/535 |
| 2014/0362805 A1* | 12/2014 | Nystrom | H04L 25/0226 370/329 |
| 2018/0048349 A1* | 2/2018 | Sun | H04W 72/0466 |
| 2019/0158338 A1 | 5/2019 | Herath et al. | |
| 2021/0067392 A1 | 3/2021 | Abdoli et al. | |

\* cited by examiner

*Primary Examiner* — Kabir A Timory

(57) ABSTRACT

A transmission method, and corresponding transmitter are provided that use a combination of sparse symbol mapping with non-sparse spreading. This can be used for a low-PAPR multiple access scheme where good performance is achieved by sparse domain multi-user detection. The provided method uses per-frequency block time-domain non-sparse spreading across sparse blocks which provides PAPR reduction. Sparsity patterns are partitioned into groups that allows PAPR reduction. The method may be used to support the transmission of a single-carrier signal, e.g. DFT-spread signal, to provide PAPR reduction. More generally the provided method can use any low-PAPR waveform, for example any single-carrier waveform or any single-subcarrier waveform.

20 Claims, 17 Drawing Sheets

| Group # | Sparse patterns<br>N=6, K=2 |
|---|---|
| 1 | [1,1,0,0,0,0], [0,0,1,1,0,0], [0,0,0,0,1,1] |
| 2 | [1,0,0,0,0,1], [0,1,1,0,0,0], [0,0,0,1,1,0] |
| 3 | [1,0,1,0,0,0], [0,1,0,0,1,0], [0,0,0,1,0,1] |
| 4 | [1,0,0,1,0,0], [0,1,0,0,0,1], [0,0,1,0,1,0] |
| 5 | [1,0,0,0,1,0], [0,1,0,1,0,0], [0,0,1,0,0,1] |

FIG. 9

SYSTEM AND METHOD FOR SINGLE-CARRIER MULTIPLE ACCESS TRANSMISSION

FIELD

The application relates to wireless communications generally, and more particularly to single-carrier multiple-access transmission systems and methods.

BACKGROUND

In a non-orthogonal multiple access (NoMA) scheme, a transmitter design that has low peak to average power ratio (PAPR) and cubic metric (CM) properties while having robust collision handling capability is desired. Such a multiple access scheme finds applications in coverage limited scenarios and has the advantage of low cost device manufacturing (for example low cost power amplifier) among others.

An existing multiple access scheme that attempts to achieve low-PAPR and robust collision handling features forward error correction (FEC) encoding, modulation, discrete Fourier transform (DFT) spreading, subcarrier mapping, inverse fast Fourier transform and cyclic prefix insertion. DFT spreading with an equally-spaced sparse subcarrier mapping results in a low-PAPR transmit design. User equipment (UE) specific sparse subcarrier mappings are used in order to control collisions.

At the receiver side, at first, multi-user detection including de-mapping will be performed based on a sparse mapping using a sparsity pattern (performed at the transmitter) and subsequently, DFT de-spreading will be applied. UEs use UE/layer specific sparse symbol mapping patterns and such sparse mapping patterns can be designed to keep the effect of collided symbols/resources at a controlled level. The sparsity pattern indicates where the transmission symbols will be mapped or left empty. In other words, a sparse symbol mapping can be represented by a sequence of 1s and 0s, where "1" indicates a non-zero symbol(s) mapped to the resource and "0" indicates a resource that is left empty. Generation of a sparse symbol sequence means generating a set of symbols where at least one of the symbols represents nullity/zero/nil (indicated by 0). The nullity/zero/nil symbol is indicated or represented by a state of the resource(s). For example, a zero constellation point (i.e., a constellation symbol with zero power) may represent the zero/nullity/nil. Physical or logical resources such as frequency, time, antenna ports, antenna elements, sub-carriers, one or more resource elements (REs), one or more resource blocks (RBs), beams, frequency bands etc. may be used. This means that, for example, a 1 or 0 may occupy one or more RE(s), RB(s), subcarriers etc. Sparsity patterns can be designed in a way that two sparsity patterns of two transmissions collide only on a pre-determined number of resources/symbols. As such, only a portion of the transmission of one UE will collide with the transmission of another UE keeping the amount of collision and hence the interference to each other transmission at controlled levels.

On the other hand, by using sparsity patterns that are entirely non-overlapping, the interference caused from one transmission to another can be avoided. Such a scheme can be considered to result in orthogonal transmissions.

As such, sparsity patterns can be non-overlapping, partially overlapping or fully-overlapping with varying levels of interference. To keep a balance between collision and detection performance, sparsity patterns can be assigned to the UEs. By using the sparsity patterns at the receiver, multiple UEs that are sharing the same physical resources are detected/decoded. However, a major drawback of this approach is caused by DFT de-spreading. At the receiver, after multi-user detection, DFT de-spreading is performed. Because of this, interference caused by partially overlapping sparsity patterns can cause all symbols to be contaminated after DFT de-spreading, and hence the log-likelihood ratios (LLRs) will be contaminated.

SUMMARY

A transmission method, and corresponding transmitter are provided that use a combination of sparse symbol mapping with non-sparse spreading. This can be used for a low-PAPR multiple access scheme where good performance is achieved by sparse domain multi-user detection.

The provided method uses per-frequency block time-domain non-sparse spreading across sparse blocks which provides PAPR reduction. Sparsity patterns are partitioned into groups that allows PAPR reduction.

The method may be used to support the transmission of a single-carrier signal, e.g. DFT-spread signal, to provide PAPR reduction. More generally the provided method can use any low-PAPR waveform, for example any single-carrier waveform or any single-subcarrier waveform.

The method may be used with frequency hopping to provide signature space extension to support more UEs and exploit frequency diversity.

The method may be used with other forms of signature space extension (e.g. using cover code) to expand the signature pool so as to enable supporting more UEs.

The provided approaches can be used in low-PAPR multiple access schemes in wireless systems such as 5G, 6G, Wi-fi etc.

According to one aspect of the present disclosure, there is provided a method comprising: dividing a set of input symbols to be transmitted into L sets of input symbols, where L is an integer $\geq 2$; applying time-domain sparse spreading to each of the L sets of input symbols, by using a respective one of a set of L sparsity patterns to produce a respective sparse spreading block, each sparsity pattern having an equal number of positions to which input symbols are mapped, the set of sparsity patterns being such that only one sparsity pattern maps to each position; applying non-sparse spreading in a time domain based on the sparse spreading blocks to produce a set of non-sparse spreading blocks; and transmitting a signal based on the set of non-sparse spreading blocks.

Optionally, each of the L sets of input symbols comprises J sets of K symbols, where $J \geq 1$; for each of the L sets of input symbols, applying time-domain sparse spreading comprises: applying the respective sparsity pattern to each of the J sets of K symbols to produce a respective one of J sparse sequences of N symbols, the J sparse sequences of N symbols collectively comprising the respective sparse spreading block; where J is the size of a frequency dimension of the sparse spreading blocks, $K \geq 1$, and $N > K$.

Optionally, the method further comprises: applying a linear transformation to the sparse spreading blocks to produce linearly transformed sparse spreading blocks; wherein applying non-sparse spreading in the time domain based on the sparse spreading blocks to produce the set of non-sparse spreading blocks comprises applying non-sparse spreading to the set of linearly transformed sparse spreading blocks.

Optionally, applying a linear transformation comprises applying a discrete Fourier transform (DFT) having size J.

Optionally, the method further comprises applying a cover code to the sparse spreading blocks.

Optionally, the method further comprises: applying frequency hopping among a plurality of frequency resources to the set of non-sparse spreading blocks, wherein symbols of the non-sparse spreading blocks that are derived from a same symbol of the set of input symbols use a same frequency resource of the plurality of frequency resources.

Optionally, each sparse spreading block includes a zero sub-block corresponding to each position in the sparsity pattern to which symbols are not mapped and a non-zero sub-block corresponding to position in the sparsity pattern to which symbols are mapped; performing non-sparse spreading based on the sparse spreading blocks to produce a set of non-sparse spreading blocks comprises: for each sparse spreading block, mapping each non-zero sub-block of the sparse spreading block to a correspondingly positioned zero sub-block in each other sparse spreading block; wherein mapping coefficients from a respective row or column of a unitary matrix are used in the mapping of each sparse spreading block.

Optionally, the method further comprises performing discrete Fourier transform-spread-orthogonal frequency division modulation (DFT-S-OFDM) on the input symbols.

According to another aspect of the present disclosure, there is provided a method comprising: processing a received signal to produce a set of non-sparse spreading blocks; performing non-sparse de-spreading across the set of non-sparse spreading blocks to produce a set of sparse spreading blocks; performing multi-user detection based on the set of sparse spreading blocks using a plurality of sets of L sparsity patterns, each sparsity pattern of a set having an equal number of positions to which input symbols are mapped, each set of sparsity patterns being such that only one sparsity pattern maps to each position, to detect a respective transmission that was made using a respective one set of the plurality of sets of sparsity patterns, where L is an integer ≥2; processing each detected transmission to recover transmitted data.

Optionally, the method further comprises applying cover codes as part of the performing multi-user detection.

Optionally, the method further comprises: performing symbol-to-resource element de-mapping with frequency hopping among a plurality of frequency resources to account for frequency hopping applied to a set of non-sparse spreading blocks for each transmission, wherein symbols of the non-sparse spreading blocks that are derived from a same symbol use a same frequency resource of said plurality of frequency resources.

Optionally, performing non-sparse de-spreading across the set of non-sparse spreading blocks to produce a set of sparse spreading blocks comprises: using a row or a column of a unitary matrix to produce each sparse spreading block, wherein the unitary matrix is a complex conjugate of a unitary matrix used in the generation of the signals.

According to another aspect of the present disclosure, there is provided an apparatus comprising: a processor and a memory; wherein the apparatus configured to perform a method comprising: dividing a set of input symbols to be transmitted into L sets of input symbols, where L is an integer≥2; applying time-domain sparse spreading to each of the L sets of input symbols, by using a respective one of a set of L sparsity patterns to produce a respective sparse spreading block, each sparsity pattern having an equal number of positions to which input symbols are mapped, the set of sparsity patterns being such that only one sparsity pattern maps to each position; applying non-sparse spreading in a time domain based on the sparse spreading blocks to produce a set of non-sparse spreading blocks; and transmitting a signal based on the set of non-sparse spreading blocks.

Optionally, each of the L sets of input symbols comprises J sets of K symbols, where J≥1; for each of the L sets of input symbols, applying time-domain sparse spreading comprises: applying the respective sparsity pattern to each of the J sets of K symbols to produce a respective one of J sparse sequences of N symbols, the J sparse sequences of N symbols collectively comprising the respective sparse spreading block; where J is the size of a frequency dimension of the sparse spreading blocks, K≥1, and N>K.

Optionally, the apparatus is further configured to: apply a linear transformation to the sparse spreading blocks to produce linearly transformed sparse spreading blocks; wherein applying non-sparse spreading in the time domain based on the sparse spreading blocks to produce the set of non-sparse spreading blocks comprises applying non-sparse spreading to the set of linearly transformed sparse spreading blocks.

Optionally, applying a linear transformation comprises applying a discrete Fourier transform (DFT) having size J.

Optionally, the apparatus is further configured to apply a cover code to the sparse spreading blocks.

Optionally, the apparatus is further configured: apply frequency hopping among a plurality of frequency resources to the set of non-sparse spreading blocks, wherein symbols of the non-sparse spreading blocks that are derived from a same symbol of the set of input symbols use a same frequency resource of the plurality of frequency resources.

Optionally, each sparse spreading block includes a zero sub-block corresponding to each position in the sparsity pattern to which symbols are not mapped and a non-zero sub-block corresponding to position in the sparsity pattern to which symbols are mapped; performing non-sparse spreading based on the sparse spreading blocks to produce a set of non-sparse spreading blocks comprises: for each sparse spreading block, mapping each non-zero sub-block of the sparse spreading block to a correspondingly positioned zero sub-block in each other sparse spreading block; wherein mapping coefficients from a respective row or column of a unitary matrix are used in the mapping of each sparse spreading block.

Optionally, the apparatus is further configured to perform discrete Fourier transform-spread-orthogonal frequency division modulation (DFT-S-OFDM) on the input symbols.

According to another aspect of the present disclosure, there is provided an apparatus comprising: a processor and memory; wherein the apparatus is configured to: process a received signal to produce a set of non-sparse spreading blocks; perform non-sparse de-spreading across the set of non-sparse spreading blocks to produce a set of sparse spreading blocks; perform multi-user detection based on the set of sparse spreading blocks using a plurality of sets of L sparsity patterns, each sparsity pattern of a set having an equal number of positions to which input symbols are mapped, each set of sparsity patterns being such that only one sparsity pattern maps to each position, to detect a respective transmission that was made using a respective one set of the plurality of sets of sparsity patterns, where L is an integer ≥2; process each detected transmission to recover transmitted data.

Optionally, the apparatus is further configured to apply cover codes as part of the performing multi-user detection.

Optionally, the apparatus is further configured to: perform symbol-to-resource element de-mapping with frequency hopping among a plurality of frequency resources to account for frequency hopping applied to a set of non-sparse spreading blocks for each transmission, wherein symbols of the non-sparse spreading blocks that are derived from a same symbol use a same frequency resource of said plurality of frequency resources.

Optionally, performing non-sparse de-spreading across the set of non-sparse spreading blocks to produce a set of sparse spreading blocks comprises: using a row or a column of a unitary matrix to produce each sparse spreading block, wherein the unitary matrix is a complex conjugate of a unitary matrix used in the generation of the signals.

According to another aspect of the present disclosure, there is provided a non-transitory computer readable medium having instructions stored thereon that when executed by a processor cause execution of a method comprising: dividing a set of input symbols to be transmitted into L sets of input symbols, where L is an integer ≥2; applying time-domain sparse spreading to each of the L sets of input symbols, by using a respective one of a set of L sparsity patterns to produce a respective sparse spreading block, each sparsity pattern having an equal number of positions to which input symbols are mapped, the set of sparsity patterns being such that only one sparsity pattern maps to each position; applying non-sparse spreading in a time domain based on the sparse spreading blocks to produce a set of non-sparse spreading blocks; and transmitting a signal based on the set of non-sparse spreading blocks.

Optionally, each of the L sets of input symbols comprises J sets of K symbols, where J≥1; for each of the L sets of input symbols, applying time-domain sparse spreading comprises: applying the respective sparsity pattern to each of the J sets of K symbols to produce a respective one of J sparse sequences of N symbols, the J sparse sequences of N symbols collectively comprising the respective sparse spreading block; where J is the size of a frequency dimension of the sparse spreading blocks, K≥1, and N>K.

Optionally, the method further comprises: applying a linear transformation to the sparse spreading blocks to produce linearly transformed sparse spreading blocks; wherein applying non-sparse spreading in the time domain based on the sparse spreading blocks to produce the set of non-sparse spreading blocks comprises applying non-sparse spreading to the set of linearly transformed sparse spreading blocks.

Optionally, applying a linear transformation comprises applying a discrete Fourier transform (DFT) having size J.

According to another aspect of the present disclosure, there is provided a non-transitory computer readable medium having instructions stored thereon that when executed by a processor cause execution of a method comprising: processing a received signal to produce a set of non-sparse spreading blocks; performing non-sparse de-spreading across the set of non-sparse spreading blocks to produce a set of sparse spreading blocks; performing multi-user detection based on the set of sparse spreading blocks using a plurality of sets of L sparsity patterns, each sparsity pattern of a set having an equal number of positions to which input symbols are mapped, each set of sparsity patterns being such that only one sparsity pattern maps to each position, to detect a respective transmission that was made using a respective one set of the plurality of sets of sparsity patterns, where L is an integer ≥2; processing each detected transmission to recover transmitted data.

Optionally, the method further comprises applying cover codes as part of the performing multi-user detection.

BRIEF DESCRIPTION OF THE DRAWINGS

Embodiments of the disclosure will now be described with reference to the attached drawings in which:

FIG. 9 is another example of complementary groups of sparsity patterns;

DETAILED DESCRIPTION

Figure 1A:
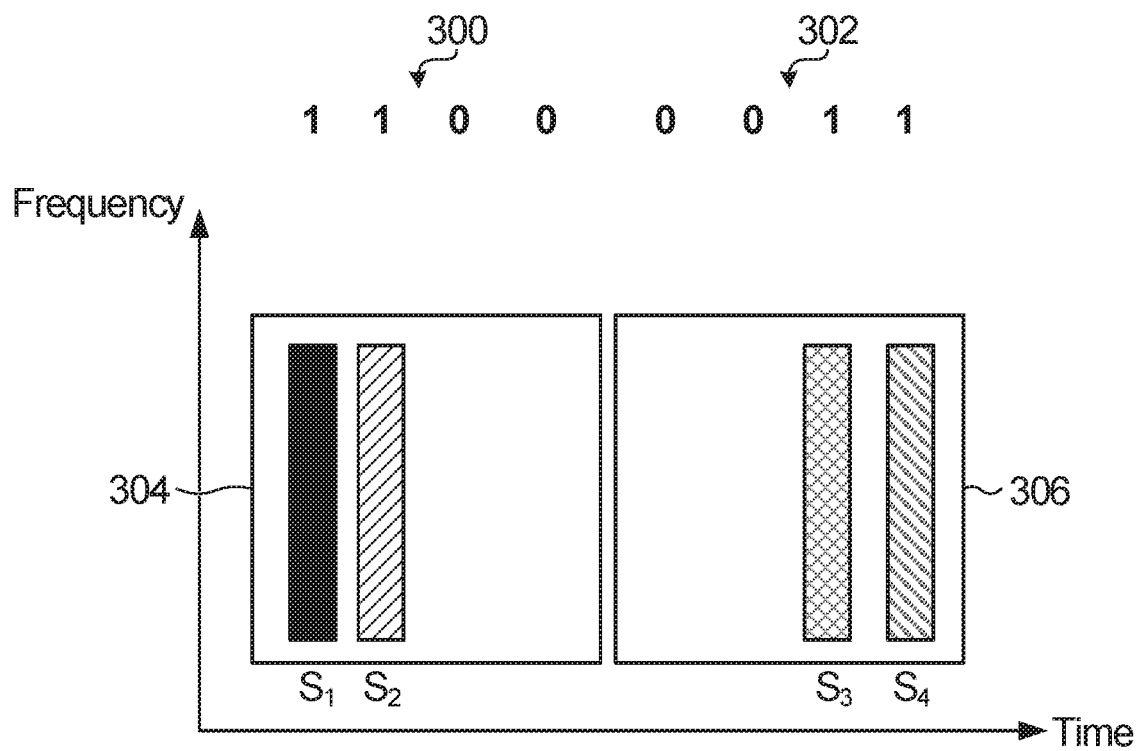
FIG. 1A shows the application of a complementary group of sparsity patterns to produce sparse spreading blocks.

The operation of the current example embodiments and the structure thereof are discussed in detail below. It should be appreciated, however, that the present disclosure provides many applicable inventive concepts that can be embodied in any of a wide variety of specific contexts. The specific embodiments discussed are merely illustrative of specific structures of the disclosure and ways to operate the disclosure, and do not limit the scope of the present disclosure.

As detailed above, DFT spreading with an equally-spaced sparse subcarrier mapping based multiple access scheme can achieve a low PAPR transmitter design but at the cost of poor performance caused by DFT de-spreading contaminating the LLRs at the receiver side. The linear transformation on time-domain sparse mappings (sparse block or sub-block based) can reduce PAPR for some sparsity patterns, but not for all sparsity patterns.

Another approach to have low-PAPR signal is to transmit using a single subcarrier. As detailed earlier, sparsity allows to the effect of collisions between multiple transmissions to be maintained at a controlled level. In a single-subcarrier transmission, sparse mappings can be used to control collision by mapping the symbols in a sparse manner in the time domain. As such, in a time-domain sparse mapping, whether a symbol is mapped or not to a physical resource is determined by the sparsity pattern. Each UE maps symbols into the physical resources in a UE specific manner. However, due to zero and non-zero symbols mapped in physical resources using time-domain sparsity, the transmit signal amplitude changes over time, which results in an increase in PAPR. To minimize this, a linear transformation over the sparse block has been proposed in commonly assigned U.S. application Ser. No. 16/559,865 hereby incorporated by reference in its entirety. The transformation is applied independent of the sparsity pattern, which is to say all sparsity patterns use the same transformation. Because of this, the transformation can be reversed/removed at the receiver side.

Linear transformations such as Hadamard transform or DFT matrix can be used. It is found that while applying a block transformation over a sparse block decreases the PAPR for some sparsity patterns, the PAPR increases for some other sparsity patterns. This is because a linear transformation can combine two or more non-zero symbols for some sparsity patterns. To avoid this issue, a sub-block based linear transformation can be used. While the sparse mapping is performed over a block of certain size, smaller size sub-blocks are linearly transformed with the objective of reducing the PAPR.

While applying sub-block transformation decreases the PAPR for some sparsity patterns, for some other sparsity patterns, PAPR can increase. This is because, for some sparsity patterns and a given sub-block linear transformation, multiple zero elements will be combined/transformed which results in zero element(s) which cause a higher PAPR. Similarly, for some sparsity patterns and the given sub-block linear transformation, multiple non-zero elements will be combined/transformed which can cause higher PAPR. As such, block or sub-block based linear transforms do not improve the PAPR performance for all sparse mapping patterns in a unified manner.

A multiple access scheme is provided that yields both acceptable multi-user detection performance through the use of sparse domain multi-user detection, and low PAPR for all sparsity patterns through the use of a combination of sparse and non-sparse spreading.

In the provided scheme, sparse sequences/patterns are grouped such that a complementary sparse pattern condition, detailed below, is satisfied. Mapping/sparse spreading of symbols is performed using the sparse patterns of the provided grouping and non-sparse spreading of the sparse symbol sequence across multiple sparse sequence/pattern blocks is performed.

Spreading can be broadly categorized as sparse and non-sparse spreading. In sparse spreading, a first sequence of symbols of length m produces a second sequence of symbols of length n where n>m and all n−m symbols are zero symbols. The location/position of the zero symbols are specified by a sparse sequence/pattern block as described earlier. For example, a symbol sequence $s_1, s_2$ of length m=2 may be sparse spread by sparse sequence/pattern [1, 0] to produce sparse spread symbol sequence of length n=4 and given by $s_1, 0, s_2, 0$. Similarly, symbol sequence $s_1, s_2$ of length m=2 may be sparse spread by sparse sequence [0, 1] to produce sparse spread symbol sequence of length n=4 and given by $0, s_1, 0, s_2$. One can view sparse spreading as mapping symbols to physical resources using a sparse sequence. For example, symbol sequence $s_1, s_2$ can be mapped to four physical resources where two resources left empty (mapping zero symbol) to achieve a similar effect to sparse spreading. As such sparse spreading can be viewed as sparse symbol mapping. The ratio between a number of non-zero symbols and a number of total symbols (both zero and non-zero components) is commonly referred to as a sparsity ratio or sparse density (i.e., the ratio between n and m). This is also referred to as a spreading factor. Other parameters such as the ratio between non-zero components to zero-components may be defined. In non-sparse spreading, a first sequence of symbols of length m produces a second sequence of symbols of length n where n≥m and all n symbols are non-zero symbols. For example, a symbol sequence $s_1, s_2$ of length m=2 may be non-sparse spread by non-sparse sequence $1/\sqrt{2}$ [1, −1] to produce non-sparse spread symbol sequence of length n=4 and given by $1/\sqrt{2}[s_1, -s_1, s_2, -s_2]$. Similarly, symbol sequence $s_1, s_2$ of length m=2 may be non-sparse spread by non-sparse sequence $1/\sqrt{2}$ [1, 1] to produce non-sparse spread symbol sequence of length n=4 and given by $1/\sqrt{2}[s_1, s_1, s_2, s_2]$. A non-sparse sequence such as $1/\sqrt{2}$ [1, 1] is referred as a linear spreading sequence. Sparse and non-sparse spreading are sometimes referred as linear spreading. In a special case where the spreading factor is one, then n=m, and the spreading sequence can be considered as [1]. Alternatively, the linear spreading can be viewed as multiplication of the modulated symbol by a sequence, referred to as a linear spreading sequence.

Spreading operations may be classified as linear or non-linear. Linear spreading may refer to an operation that creates a relationship between symbols in a sequence of symbols, where the relationship is independent of input bit values of the input bit-stream such that a change in the input values does not affect the relationship between the symbols. In the example provided earlier where symbol sequence $s_1$, $s_2$ of length m=2 is non-sparse spread by non-sparse sequence $1/\sqrt{2}[1,1]$ of length 2 (i.e., spreading sequence length 2) to produce non-sparse spread symbol sequence of length n=4 and given by $1/\sqrt{2}[s_1, s_1, s_2, s_2]$, the relationship between the spread symbol sequence of the size spreading length (i.e., 2) is fixed at [1,1]. The symbols $s_1$ and $s_2$ carry bits and those bits are modulated to symbols $s_1$ and $s_2$ by the modulation operation. The modulation operation maps bits to constellation symbols. As a result, the linear spreading technique effects amplitude, phase or both between the symbols in a manner that remains consistent across all combinations of input bit-values. Non-linear spreading may refer to an operation that creates a relationship between symbols in a sequence of symbols, where the relationship depends on input bit values of the input bit stream such that different relationships between symbols are formed for different combinations of input bit-values. A non-linear or linear spread symbol sequence can be further spread. One example is non-linear spread symbols being sparse mapped. Another example is linear spread symbols being sparse mapped. Yet, another example would be non-spread symbols being sparse mapped.

A linear/non-linear spreading sequence (including sparse/ non-sparse spreading) may be associated with a multiple access (MA) signature or, in certain cases, may be substantially the same as an MA signature. An MA signature can be any information that may be used to distinguish different data transmissions that are sent over a shared physical channel. In a wireless communication system, for example, the MA signature facilitates multi-user and/or multi-branch communications. A linear spreading sequence can define an entire MA signature or a portion of the MA signature. As mentioned before, spreading sequences can have different characteristics such as being sparse and non-sparse. The correlation properties among spreading sequences can vary significantly due to the way the sequences are constructed. The correlation properties determine the ability to separate the UEs/streams at the receiver side. In addition, the power amplifier efficiency measured by metrics such as PAPR/CM and other properties of sequences can vary significantly due to the way the sequences are constructed. The transmission schemes generally provide a mechanism to configure or assign one or more MA signature/spread sequences to the UEs or the UEs select one or more MA signatures/spreading sequences from a pool of available spreading sequences. The association of the MA signature/spread sequence to a UE is commonly viewed as one-to-one mapping of a UE specific identifier, such as radio network temporary identifier (RNTI), to the spreading sequence pool. The sparse symbol sequence mapping based on grouped sparse patterns facilitates subsequent non-sparse spreading in such a way that the receiver can perform non-sparse de-spreading with a linear operation. The non-sparse de-spreading to sparse domain in turn supports multi-user detection in the sparse domain keeping good multi-user detection performance. The non-sparse spreading can be unified for all sparse patterns/groups in the sense that all patterns will use the same non-sparse spreading method. In other words, non-sparse spreading is not dependent on chosen sparse patterns/groups, and this enables simpler receiver implementation. Furthermore, non-sparse spreading helps to alleviate the high PAPR of sparse symbol sequences. In other words, low-PAPR is achieved by non-sparse spreading which is facilitated by the sparse pattern grouping.

Additionally, some embodiments include additional features that provide further technical benefits. Those include frequency hopping, signature extension, phase shift of modulated symbols among others.

By way of overview, a transmitter performs bit-level operations such as encoding, bit scrambling, bit interleaving to produce a sequence of bits. The sequence of bits produces a sequence of symbols. The sequence of symbols can be obtained by modulation operations. In this case, symbols are independent from each other as independent bits are mapped to each symbol. Alternatively, the symbol sequence can be linear or non-linear spread sequence of symbols. The sequence of symbols is passed through a serial-to-parallel converter(s) module to get L sub-blocks of symbols, each with J symbols. In this case, J is the size of the frequency dimension, equal to the size of the DFT that processes outputs of sparse spreading, as detailed below. L is the number of patterns per group of complementary sparsity patterns, detailed below. L≥2. In parallel, each of the J symbols of the first sub-block (more specifically K consecutive instances of each of the J symbols) is subject to time domain sparse spreading as detailed below to produce a respective sparse sequence of length N, such that there are J sparse sequences. The same processing is performed for each of the L sub-blocks. For each of the L sub-blocks, the J sparse sequences of length N collectively constitutes a sparse spreading block.

For each of the L sub-blocks, the J sparse sequences are input in parallel to a DFT block that performs a DFT of size J. The output of the DFT block is mapped per frequency block in the time domain which will be described in further detail below. Following this, time-domain non-sparse spreading is performed followed by conversion back to the time domain.

An example is shown in Table 1A and 1B below. In this example, K=2, N=4, L=2, and J=12 (1 RB or 12 subcarriers in frequency). The complementary set of sparsity patterns include patterns [1, 1, 0, 0] and [0, 0, 1, 1]. Table 1A shows a first sparse spreading block, in which 24 symbols $x_1$ to $x_{24}$ in J=12 rows are mapped using [1, 1, 0, 0]. Table 1B shows second sparse spreading block in which another 24 symbols $x_{25}$ to $x_{48}$ in J=12 rows are mapped using [0, 0, 1, 1]. DFT spreading is performed on the 12 symbols in each column of each table.

TABLE 1A

Mappings using [1, 1, 0, 0]

| | | | |
|---|---|---|---|
| $x_{12}$ | $x_{24}$ | 0 | 0 |
| $x_{11}$ | $x_{23}$ | 0 | 0 |
| $x_{10}$ | $x_{22}$ | 0 | 0 |
| $x_9$ | $x_{21}$ | 0 | 0 |
| $x_8$ | $x_{20}$ | 0 | 0 |
| $x_7$ | $x_{19}$ | 0 | 0 |
| $x_6$ | $x_{18}$ | 0 | 0 |
| $x_5$ | $x_{17}$ | 0 | 0 |
| $x_4$ | $x_{16}$ | 0 | 0 |
| $x_3$ | $x_{15}$ | 0 | 0 |
| $x_2$ | $x_{14}$ | 0 | 0 |
| $x_1$ | $x_{13}$ | 0 | 0 |

TABLE 1B

Mappings using [0, 0, 1, 1]

| | | | |
|---|---|---|---|
| 0 | 0 | $x_{36}$ | $x_{48}$ |
| 0 | 0 | $x_{35}$ | $x_{47}$ |
| 0 | 0 | $x_{34}$ | $x_{46}$ |
| 0 | 0 | $x_{33}$ | $x_{45}$ |
| 0 | 0 | $x_{32}$ | $x_{44}$ |
| 0 | 0 | $x_{31}$ | $x_{43}$ |
| 0 | 0 | $x_{30}$ | $x_{42}$ |
| 0 | 0 | $x_{29}$ | $x_{41}$ |
| 0 | 0 | $x_{28}$ | $x_{40}$ |
| 0 | 0 | $x_{27}$ | $x_{39}$ |
| 0 | 0 | $x_{26}$ | $x_{38}$ |
| 0 | 0 | $x_{25}$ | $x_{37}$ |

More generally, consider a sparse mapping/pattern of length N with K non-zero elements, (and N−K zero elements). Such a sparse pattern can be represented by a sequence of 1s and 0s where 1 indicates a non-sparse symbol and a 0 indicates a zero symbol. Therefore, there are $$\binom{N}{K}$$

distinct sparse patterns. These sparsity patterns are grouped into groups of L sparsity patterns using a complementary sparsity pattern condition. In a group of complementary sparsity patterns, for each element location, there is one and only one sparsity pattern in the group whose corresponding element is 1. Stated another way, considering a sparsity pattern as a vector of 1s and 0s, the sparsity patterns are grouped such that the addition of all sparsity patterns in a group gives the non-sparsity pattern (all 1s). Stated yet another way, each sparsity pattern of a group has N positions, where N is the length of the sparsity pattern, and has an equal number of positions to which input symbols are mapped, the set of sparsity patterns being such that one and only one sparsity pattern maps to each position.

In a specific case where K=N/2, there are only two sparsity patterns in a group, and one of the patterns is an inverted version of the other, in that all "1"s in the first sparsity pattern are now "0"s in the second sparsity pattern and all "0"s in the first sparsity pattern are now "1"s in the second sparsity pattern. In this case L=2. In this case, a first K data symbols are mapped using a first sparsity pattern from the group and a second K data symbols are mapped using a second sparsity pattern from the group. This is performed in parallel J times.

In a specific example, the sparsity patterns for N=4, K=2 are grouped as follows:

Group 1: [1,1,0,0], [0,0,1,1] (flipped or inverted pattern)
Group 2: [1,0,1,0], [0,1,0,1] (flipped or inverted pattern)
Group 3: [1,0,0,1], [0,1,1,0] (flipped or inverted pattern)

Observe that the complementary sparse pattern condition is satisfied by the patterns in each group.

For a given UE, that UE uses the sparsity patterns from one of the groups sequentially. In the specific example where N=4, K=2, first and second data symbol locations (in time domain) are mapped using a first sparsity pattern from the group, and third and fourth data symbol locations (in time domain) are mapped using a second sparsity pattern from the group.

Figure 1B:
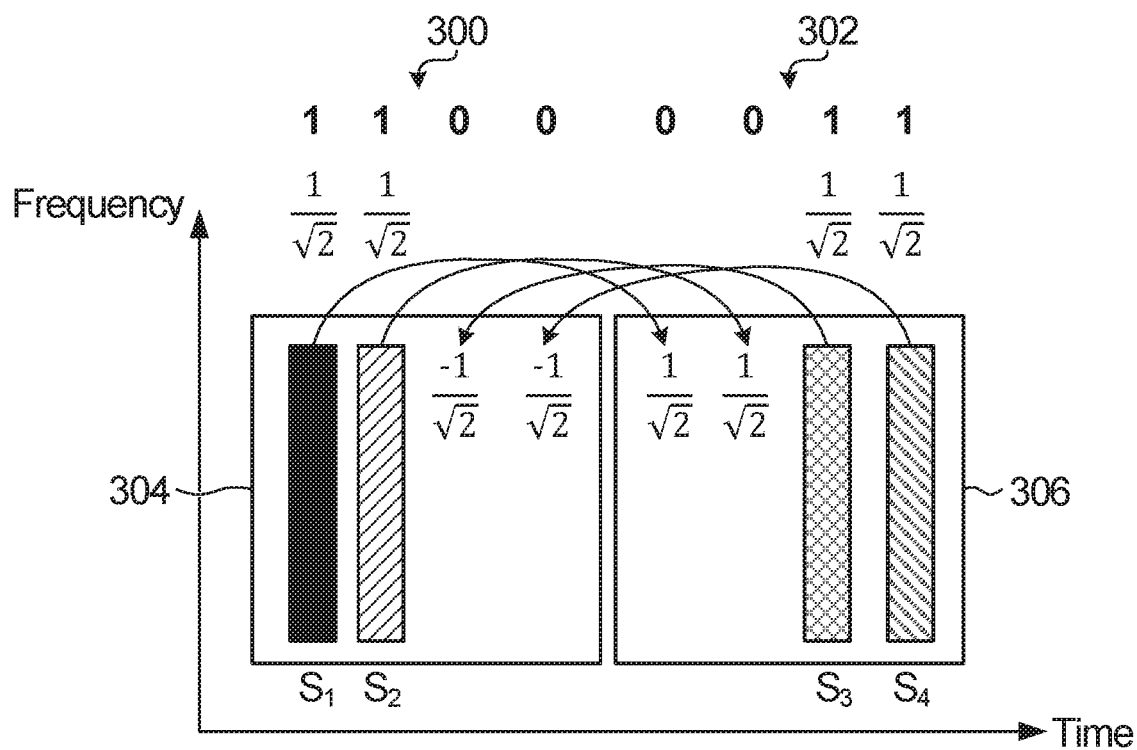
FIG. 1B shows a non-sparse spreading applied to the sparse spreading blocks of FIG. 1A.
Figure 2:
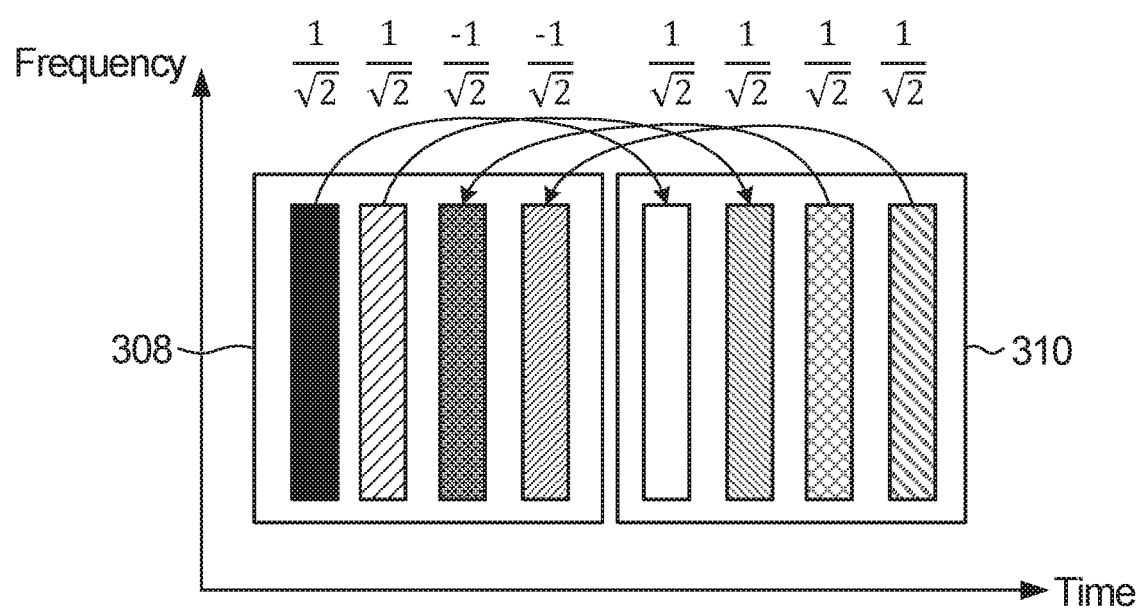
FIG. 2 shows the result of applying the non-sparse spreading.

A symbol mapping using the sparsity patterns [1,1,0,0], [0,0,1,1] in Group 1 identified above is shown in the FIG. 1A. In FIG. 1A, time is along the horizontal axis, and frequency is along the vertical axis. As shown in FIG. 1A, in the first sparse spreading block 304, non-zero sub-blocks of symbols are mapped to the first and second symbol locations and the third and fourth symbol locations are empty (zero symbol or sparse). The first sparsity pattern [1,1,0,0] is indicated at 300, and the second sparsity pattern [0,0,1,1] is indicated at 302. As a result of the mapping, a first pair of sub-blocks of symbols $S_1$, $S_2$ is mapped to the first sparse spreading block 304, and a second pair of sub-blocks of symbols $S_3$, $S_4$ is mapped to the second sparse spreading block 306, where $S_1$, $S_2$, $S_3$, $S_4$ are sub-blocks of data symbols to be transmitted. Each sparse spreading block has four symbol locations. After the sparse mapping/spreading, the non-zero sub-blocks of symbols are spread using non-sparse spreading in the time-domain as indicated by the arrows in FIG. 1B to produce the result depicted in FIG. 2, which shows two non-sparse spreading blocks 308, 310. More specifically, $S_1$, $S_2$ from the first sparse spreading block 304 are mapped to symbol locations of the second sparse spreading block 306 corresponding with "0"s in the second sparsity pattern 302, namely the first and second symbol locations. Similarly, $S_3$, $S_4$ from the second sparse spreading block 306 are mapped to symbol locations of the first sparse spreading block corresponding with "0"s in the first sparsity pattern 300, namely the third and fourth symbol locations. All symbols are multiplied by $1/\sqrt{2}$ such that the time domain spreading does not affect the overall power.

For a given UE, due to the use of sparsity patterns from the same group (satisfying the above described complementary sparsity pattern constraint), a non-zero sub-block of symbol of one sparse spreading block will spread to a zero/sparse symbol location of each other sparse spreading block. Alternatively, non-sparse spreading can be viewed as linear spreading in the time-domain where the sub-block of symbol in the first sparse block is mapped/linearly spread to multiple blocks. It should be noted that non-sparse spread symbols are four symbol locations apart (equal number of symbol locations apart for all symbols from one spreading block to another). As such, it can be seen that all four symbol locations in the first sparse spreading block have one-to-one correspondence with the symbol locations of the second sparse spreading blocks. Due to this structure, symbols can be spread in the time-domain (non-sparse spreading) across multiple sparse spreading blocks, with each UE using a same spreading matrix, resulting in a unified approach for all non-sparse spreading. Such a unified approach for non-sparse spreading is advantageous because irrespective of the sparsity pattern(s) used at the transmitter, the receiver can use the same non-sparse de-spreading, which simplifies receiver implementation.

The magnitudes of the time domain non-sparse spreading can be represented by a unitary matrix:

$$A = \begin{pmatrix} a_{11} & a_{12} \\ a_{21} & a_{22} \end{pmatrix} = \frac{1}{\sqrt{2}} \begin{pmatrix} 1 & 1 \\ 1 & -1 \end{pmatrix}$$

where the first column represents the non-sparse spreading sequence applied to the first sparse spreading block to spread the first spreading block to the first and second non-sparse spreading blocks respectively, and the second column represents non-sparse spreading sequence applied to the second spreading block to spread the second spreading block to the second and first non-sparse spreading blocks respectively. While a specific unitary matrix is used for the example, another unitary matrix may alternatively be used.

At the receiver side, the receiver performs de-spreading knowing A to bring symbols to the sparse domain prior to multi-user detection.

To illustrate this, consider the transmitter side signal model. For the purpose of illustration, only the first symbol location of all 6 sparse patterns for N=4, K=2 is considered, i.e. only one symbol in J symbols of a sub-block. The symbol $s_i^{(j)}$ indicates the ith non-zero sub-block of symbols of the jth UE, and 0 represents the sparsity/zero symbol. Table 1 below shows outputs for all 6 sparse patterns after sparse spreading.

TABLE 1

| | Sparse block 1 | | | | Sparse block 2 | | | |
|---|---|---|---|---|---|---|---|---|
| Pattern | Symb. 1 | Symb. 2 | Symb. 3 | Symb. 4 | Symb. 1 | Symb. 2 | Symb. 3 | Symb. 4 |
| 1 | $s_1^{(1)}$ | $s_2^{(1)}$ | 0 | 0 | 0 | 0 | $s_3^{(1)}$ | $s_4^{(1)}$ |
| 2 | $s_1^{(2)}$ | 0 | $s_2^{(2)}$ | 0 | 0 | $s_3^{(2)}$ | 0 | $s_4^{(2)}$ |
| 3 | $s_1^{(3)}$ | 0 | 0 | $s_2^{(3)}$ | 0 | $s_3^{(3)}$ | $s_4^{(3)}$ | 0 |
| 4 | 0 | $s_1^{(4)}$ | $s_2^{(4)}$ | 0 | $s_3^{(4)}$ | 0 | 0 | $s_4^{(4)}$ |
| 5 | 0 | $s_1^{(5)}$ | 0 | $s_2^{(5)}$ | $s_3^{(5)}$ | 0 | $s_4^{(5)}$ | 0 |
| 6 | 0 | 0 | $s_1^{(6)}$ | $s_2^{(6)}$ | $s_3^{(6)}$ | $s_4^{(6)}$ | 0 | 0 |

After non-sparse spreading of the symbols, for all patterns/UEs, the resulting signals can be as shown in Table 2 below.

TABLE 2

| Pattern | Sparse block 1 | | | | Sparse block 2 | | | |
|---|---|---|---|---|---|---|---|---|
| | Symb. 1 | Symb. 2 | Symb. 3 | Symb. 4 | Symb. 1 | Symb. 2 | Symb. 3 | Symb. 4 |
| 1 | $a_{11}s_1^{(1)}$ | $a_{11}s_2^{(1)}$ | $a_{12}s_3^{(1)}$ | $a_{12}s_4^{(1)}$ | $a_{21}s_1^{(1)}$ | $a_{21}s_2^{(1)}$ | $a_{22}s_3^{(1)}$ | $a_{22}s_4^{(1)}$ |
| 2 | $a_{11}s_1^{(2)}$ | $a_{12}s_3^{(2)}$ | $a_{11}s_2^{(2)}$ | $a_{12}s_4^{(2)}$ | $a_{21}s_1^{(2)}$ | $a_{22}s_3^{(2)}$ | $a_{21}s_2^{(2)}$ | $a_{22}s_4^{(2)}$ |
| 3 | $a_{11}s_1^{(3)}$ | $a_{12}s_3^{(3)}$ | $a_{12}s_4^{(3)}$ | $a_{11}s_2^{(3)}$ | $a_{21}s_1^{(3)}$ | $a_{22}s_3^{(3)}$ | $a_{22}s_4^{(3)}$ | $a_{21}s_2^{(3)}$ |
| 4 | $a_{12}s_3^{(4)}$ | $a_{11}s_1^{(4)}$ | $a_{11}s_2^{(4)}$ | $a_{12}s_4^{(4)}$ | $a_{22}s_3^{(4)}$ | $a_{21}s_1^{(4)}$ | $a_{21}s_2^{(4)}$ | $a_{22}s_4^{(4)}$ |
| 5 | $a_{12}s_3^{(5)}$ | $a_{11}s_1^{(5)}$ | $a_{12}s_4^{(5)}$ | $a_{11}s_2^{(5)}$ | $a_{22}s_3^{(5)}$ | $a_{21}s_1^{(5)}$ | $a_{22}s_4^{(5)}$ | $a_{21}s_2^{(5)}$ |
| 6 | $a_{12}s_3^{(6)}$ | $a_{12}s_4^{(6)}$ | $a_{11}s_1^{(6)}$ | $a_{11}s_2^{(6)}$ | $a_{22}s_3^{(6)}$ | $a_{22}s_4^{(6)}$ | $a_{21}s_1^{(6)}$ | $a_{21}s_2^{(6)}$ |
| Received signal | $y_{11}$ | $y_{21}$ | $y_{31}$ | $y_{41}$ | $y_{12}$ | $y_{22}$ | $y_{32}$ | $y_{42}$ |

Over an AWGN channel, the received signal $y_i$ in sparse block $i \in \{1,2\}$ can be given as $$\begin{cases} y_{11} = (s_1^{(1)} + s_1^{(2)} + s_1^{(3)})a_{11} + (s_3^{(4)} + s_3^{(5)} + s_3^{(6)})a_{12} + n_{11} \\ y_{12} = (s_1^{(1)} + s_1^{(2)} + s_1^{(3)})a_{21} + (s_3^{(4)} + s_3^{(5)} + s_3^{(6)})a_{22} + n_{12} \end{cases}$$

$$\begin{cases} y_{21} = (s_2^{(1)} + s_1^{(4)} + s_1^{(5)})a_{11} + (s_3^{(2)} + s_3^{(3)} + s_4^{(6)})a_{12} + n_{21} \\ y_{22} = (s_2^{(1)} + s_1^{(4)} + s_1^{(5)})a_{21} + (s_3^{(2)} + s_3^{(3)} + s_4^{(6)})a_{22} + n_{22} \end{cases}$$

$$\begin{cases} y_{31} = (s_2^{(2)} + s_2^{(4)} + s_1^{(6)})a_{11} + (s_3^{(1)} + s_4^{(3)} + s_4^{(5)})a_{12} + n_{31} \\ y_{32} = (s_2^{(2)} + s_2^{(4)} + s_1^{(6)})a_{21} + (s_3^{(1)} + s_4^{(3)} + s_4^{(5)})a_{22} + n_{32} \end{cases}$$

$$\begin{cases} y_{41} = (s_2^{(3)} + s_2^{(5)} + s_2^{(6)})a_{11} + (s_4^{(1)} + s_4^{(2)} + s_4^{(4)})a_{12} + n_{41} \\ y_{42} = (s_2^{(3)} + s_2^{(5)} + s_2^{(6)})a_{21} + (s_4^{(1)} + s_4^{(2)} + s_4^{(4)})a_{22} + n_{42} \end{cases}$$

As a result, one can write $$\begin{pmatrix} y_{11} \\ y_{12} \end{pmatrix} = A \begin{pmatrix} s_1^{(1)} + s_1^{(2)} + s_1^{(3)} \\ s_3^{(4)} + s_3^{(5)} + s_3^{(6)} \end{pmatrix} + \begin{pmatrix} n_{11} \\ n_{12} \end{pmatrix}.$$

$$\begin{pmatrix} y_{21} \\ y_{22} \end{pmatrix} = A \begin{pmatrix} s_2^{(1)} + s_1^{(4)} + s_1^{(5)} \\ s_3^{(2)} + s_3^{(3)} + s_4^{(6)} \end{pmatrix} + \begin{pmatrix} n_{21} \\ n_{22} \end{pmatrix}.$$

$$\begin{pmatrix} y_{31} \\ y_{32} \end{pmatrix} = A \begin{pmatrix} s_2^{(2)} + s_2^{(4)} + s_1^{(6)} \\ s_3^{(1)} + s_4^{(3)} + s_4^{(5)} \end{pmatrix} + \begin{pmatrix} n_{31} \\ n_{32} \end{pmatrix}.$$

$$\begin{pmatrix} y_{41} \\ y_{42} \end{pmatrix} = A \begin{pmatrix} s_2^{(3)} + s_2^{(5)} + s_2^{(6)} \\ s_4^{(1)} + s_4^{(2)} + s_4^{(4)} \end{pmatrix} + \begin{pmatrix} n_{41} \\ n_{42} \end{pmatrix}.$$

As a result, at the receiver side the effect of non-sparse spreading can be removed using $A^H$ where $(\bullet)^H$ indicates the conjugate transpose of a matrix. Although superimposed at the transmitter side by non-sparse spreading, signals can be de-spread/recovered to the sparse domain which leads to good multi-user detection performance.

As a result of time-domain non-sparse spreading, symbols are non-sparse. If the symbols subject to sparse spreading are DFT-s-OFDM symbols, then after the non-sparse spreading, the overall PAPR will be the same as that of DFT-s-OFDM symbols. A DFT is used at the output of sparse spreading in the case of DFT-s-OFDM. More generally, for whatever type of waveform that is subject to sparse spreading, the overall PAPR will be the same as it is for that type of waveform. A DFT is a specific example of a linear transformation having dimension J that can be applied at the output of the sparse spreading. In some embodiments, other linear transformations, such as a Hadamard transform, may be used.

Figure 3A:
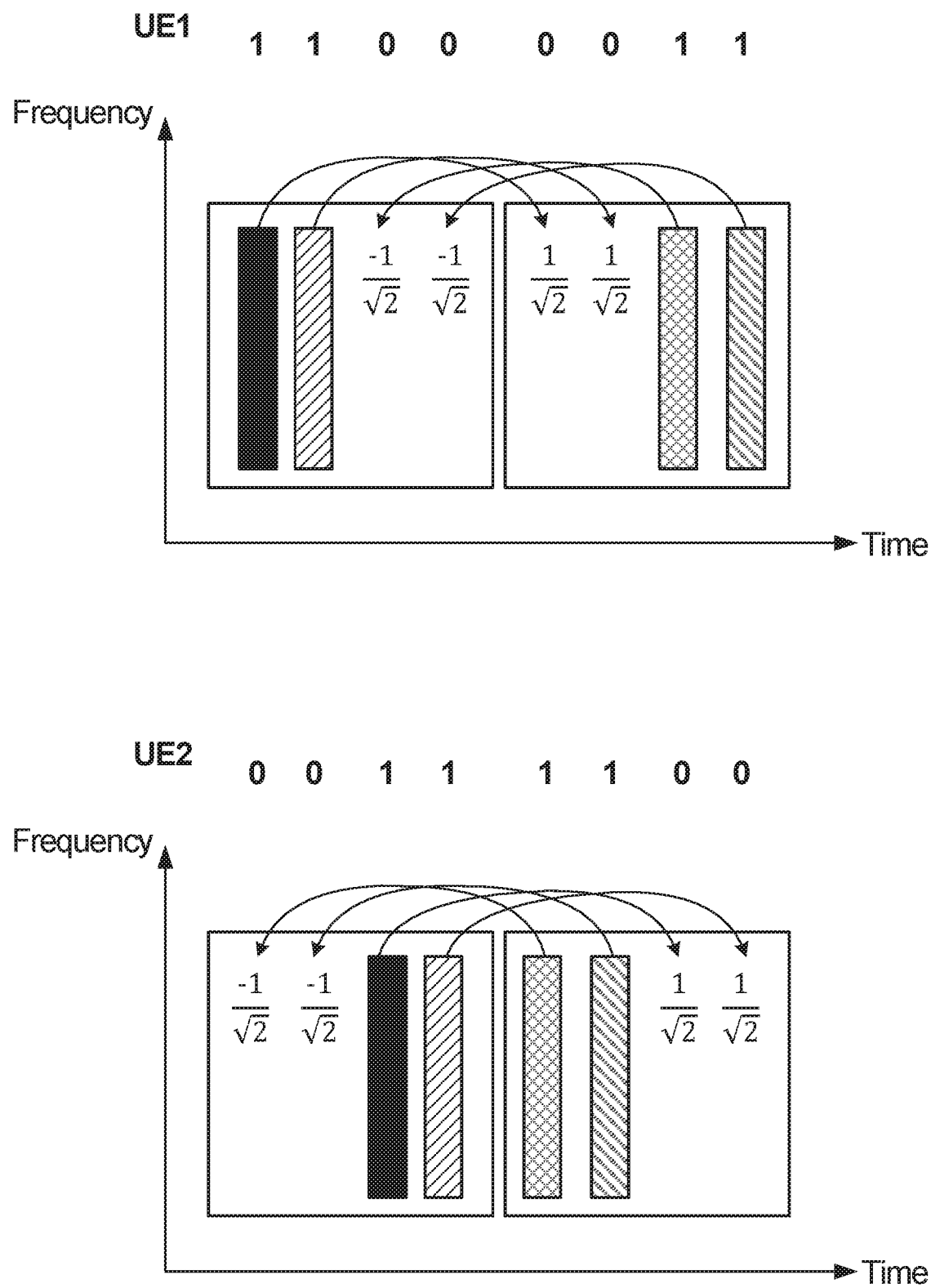
FIG. 3A to 3C show three sets of UEs each using sparsity patterns from a respective complementary group.
Figure 3B:
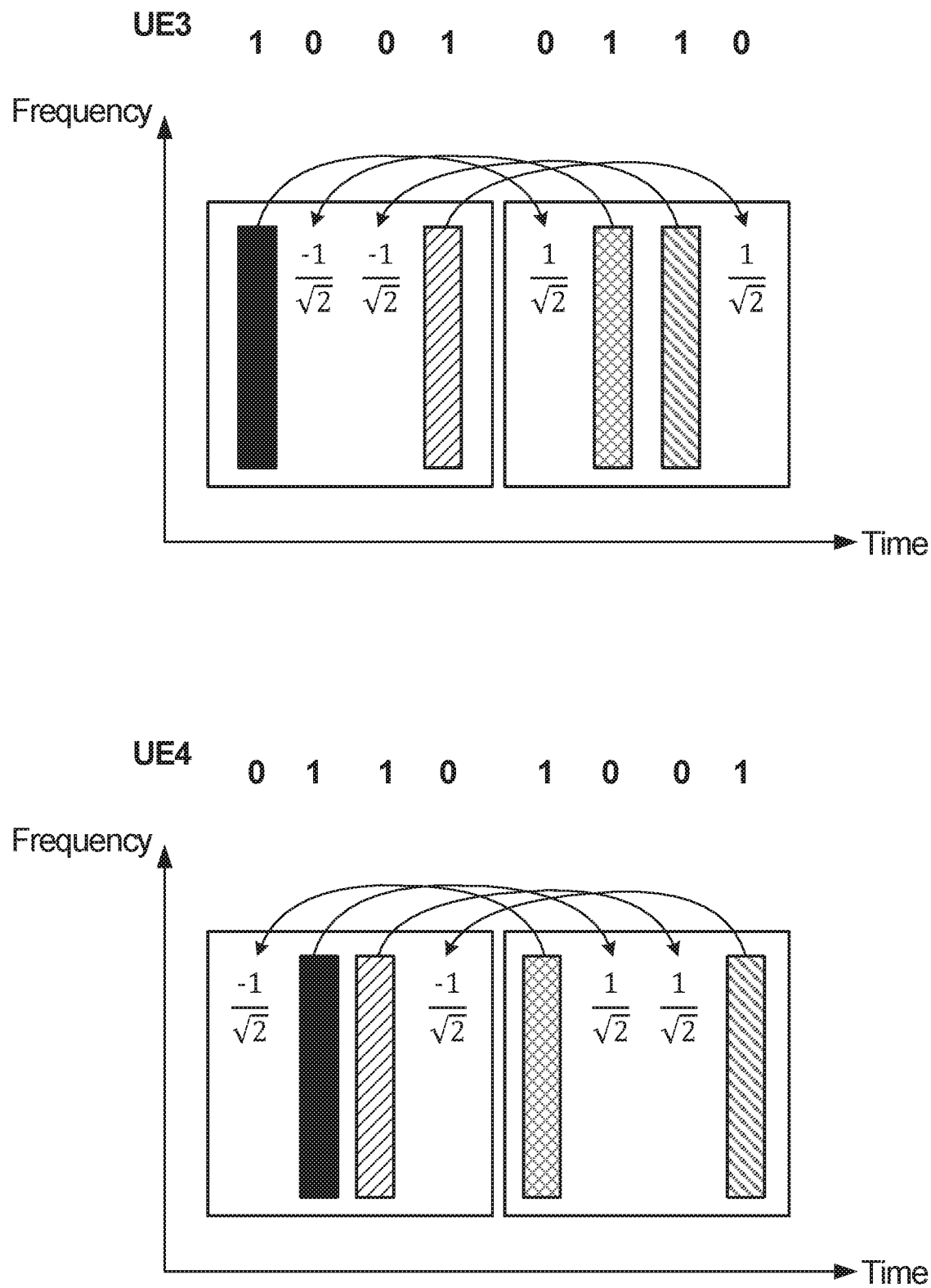
Figure 3C:
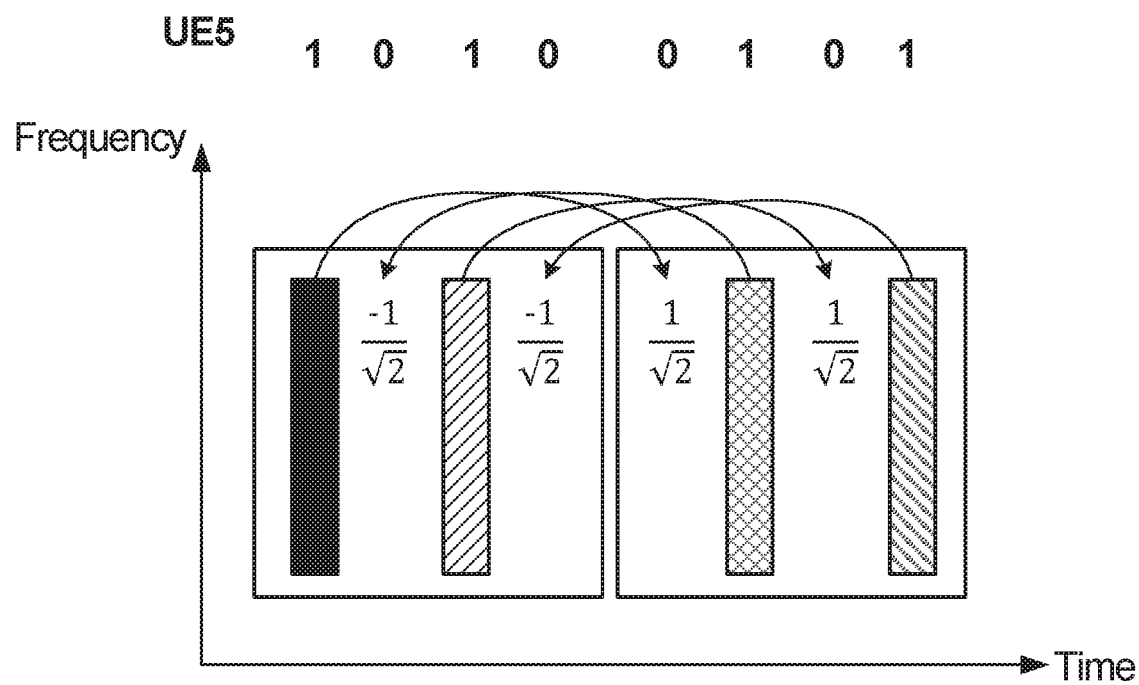
Figure 3C:
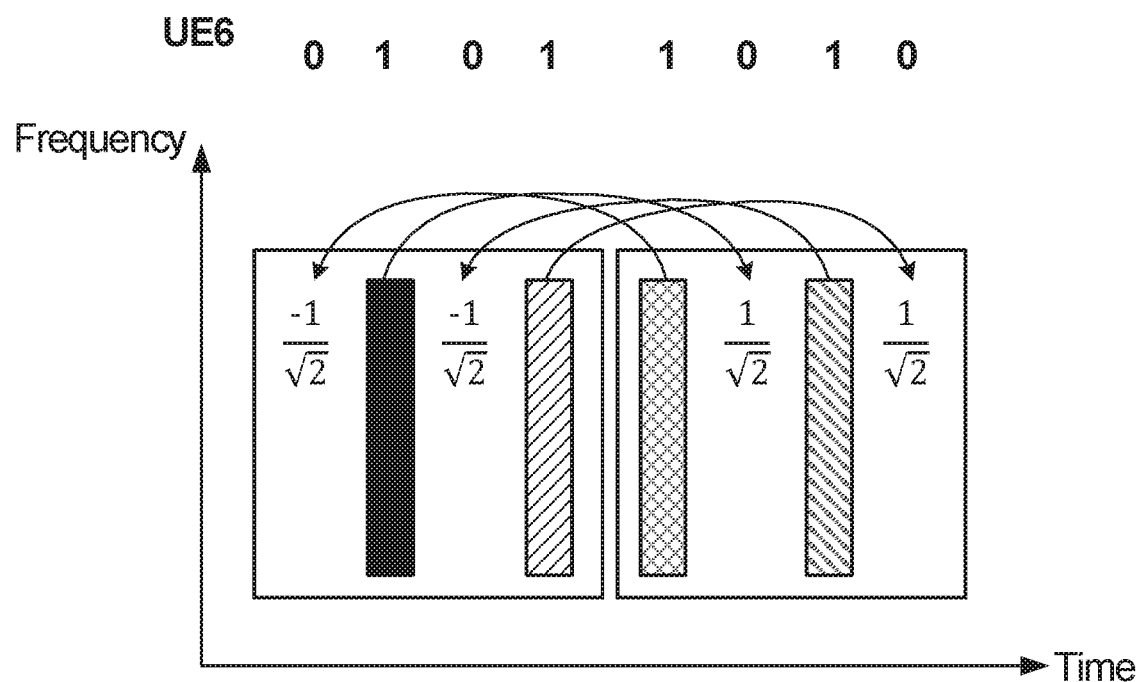

Using the same sparsity patterns from Group 1, but in a different order, i.e. [0,0,1,1], [1,1,0,0], another UE can be supported. As such, for this example, using six sparsity patterns in 3 groups, six UEs are supported. This is shown in FIGS. 3A-3C where UE1 and UE2 use the sparsity patterns, but in opposite orders, from Group 1, UE3 and UE4 use the sparsity patterns, but in opposite orders, from Group 2, UE5 and UE6 use the sparsity patterns, but in opposite orders, from Group 3.

In general, although grouping helps achieve good multi-user detection performance and low-PAPR transmitter design, grouping does not reduce the number of UEs supported (i.e., number of UEs supported remains the same). In the illustrative example, in the regular scenario of 6 sparse patterns which can be assigned to 6 UEs, grouped sparse patterns can be assigned to 6 UEs as well.

Figure 4:
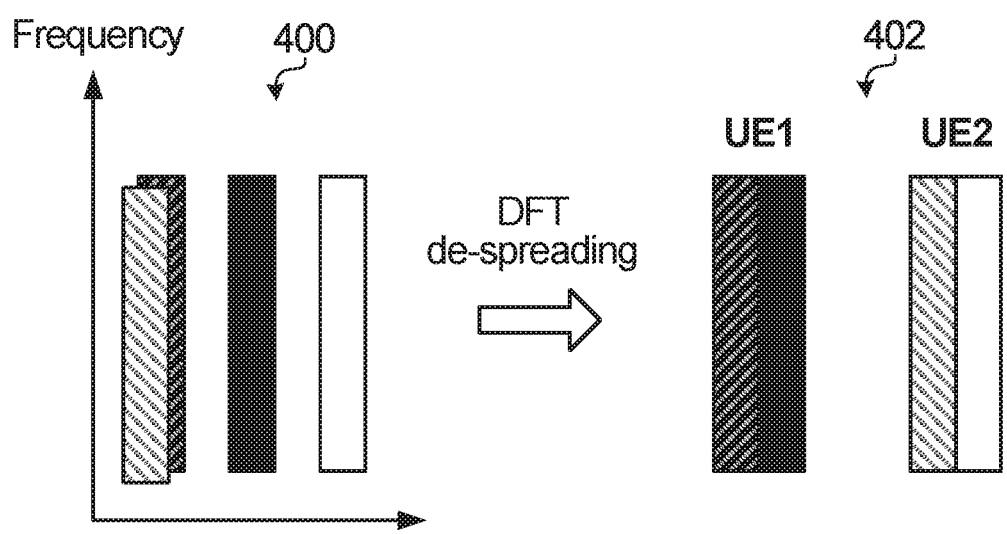
FIG. 4 shows the interference effect of the provided method.

As compared to the drawback of LLR contamination due to the partial collision scheme described previously, the provided scheme has a clear advantage, as depicted in FIG. 4. FIG. 4 shows a situation prior to DFT de-spreading, generally indicated at 400, in which only half a transmission is collided with another specific transmission while the other portion of each transmission is not collided with that same transmission, with time-domain mapping. The situation after DFT de-spreading, generally indicated at 402, shows that only the portion that is collided with one another will be impacted, but the non-collided portion will remain intact without being contaminated by the collided portion. As such, by the provided time-domain sparse mapping, the interference caused by the partially collided portion of the transmission is constrained to the collided portion of the transmissions/symbols, both before and after DFT de-spreading. Therefore, DFT de-spreading does not de-spread interference to the other non-collided transmission portion/symbols which avoids the LLR contamination. This is achieved by bringing the non-sparse spread symbols back into sparse domain and performing DFT de-spreading on the time-domain sparse spread symbols.

It is noted that DFT-s-OFDM is only a specific example waveform. In fact, any waveform can be applied over the provided sparse spreading/mapping and non-sparse spreading scheme. In other words, waveform related operations/sub-blocks of the transmit chain have been decoupled from the multiple-access related operations/sub-blocks (i.e., provided sparse mapping/spreading and non-sparse spreading). This is particularly important to enable multiple waveform support. For example, the provided scheme can be applied to any low-PAPR waveform, including any single-carrier waveform e.g. DFT-s-OFDM (with or without FDSS), SC-OQAM (single carrier offset quadrature amplitude modulation), etc. The provided solution achieves the (low)-PAPR of the underlying waveform/modulation while providing good multi-user collision handling via sparsity.

The described multiple-access related operations such as sparse spreading and non-sparse spreading can be two separate blocks or a single block.

In the case of sparse mapping/spreading and non-sparse spreading as separate blocks, the transmit chain has a sparse mapping followed by non-sparse spreading. For example, if low-PAPR transmit design is not a critical requirement, the waveform can be, for example, CP-OFDM, in which case subsequent non-sparse spreading is optional. A transmitter configuration (indicated e.g. by signalling, configured, implied, preset) may be used to indicate whether the non-sparse spreading block is to be used or not for a specific waveform type. As an example, a UE transmitter may be configured to not use non-sparse spreading if the waveform to be used is CP-OFDM (implied or implicitly known) and configured to use the non-sparse spreading block if DFT-s-OFDM is used. In another example, UE transmitter is indicated or signalled to use (or not use) the non-sparse spreading block explicitly (without depending on the other parameters/configurations such as waveform type). Such signaling can be done by downlink control information (DCI), medium access control-control element (MAC-CE) or radio resource control (RRC) signaling.

In the case of sparse mapping/spreading and non-sparse spreading in a single block, both sparse spreading/mapping and/or non-sparse spreading operation(s) are defined in a single block. In one configuration, this block may perform both sparse spreading/mapping and non-sparse spreading operations. Such configurations can produce a low-PAPR multiple-access signal. In another configuration, this block may perform sparse mapping/spreading only. Such a configuration produces a multiple-access signal that supports sparse symbol mapping/spreading which has good multi-user detection performance. Configurations of this block can be explicitly specified, indicated, signalled or implied.

Figure 5:
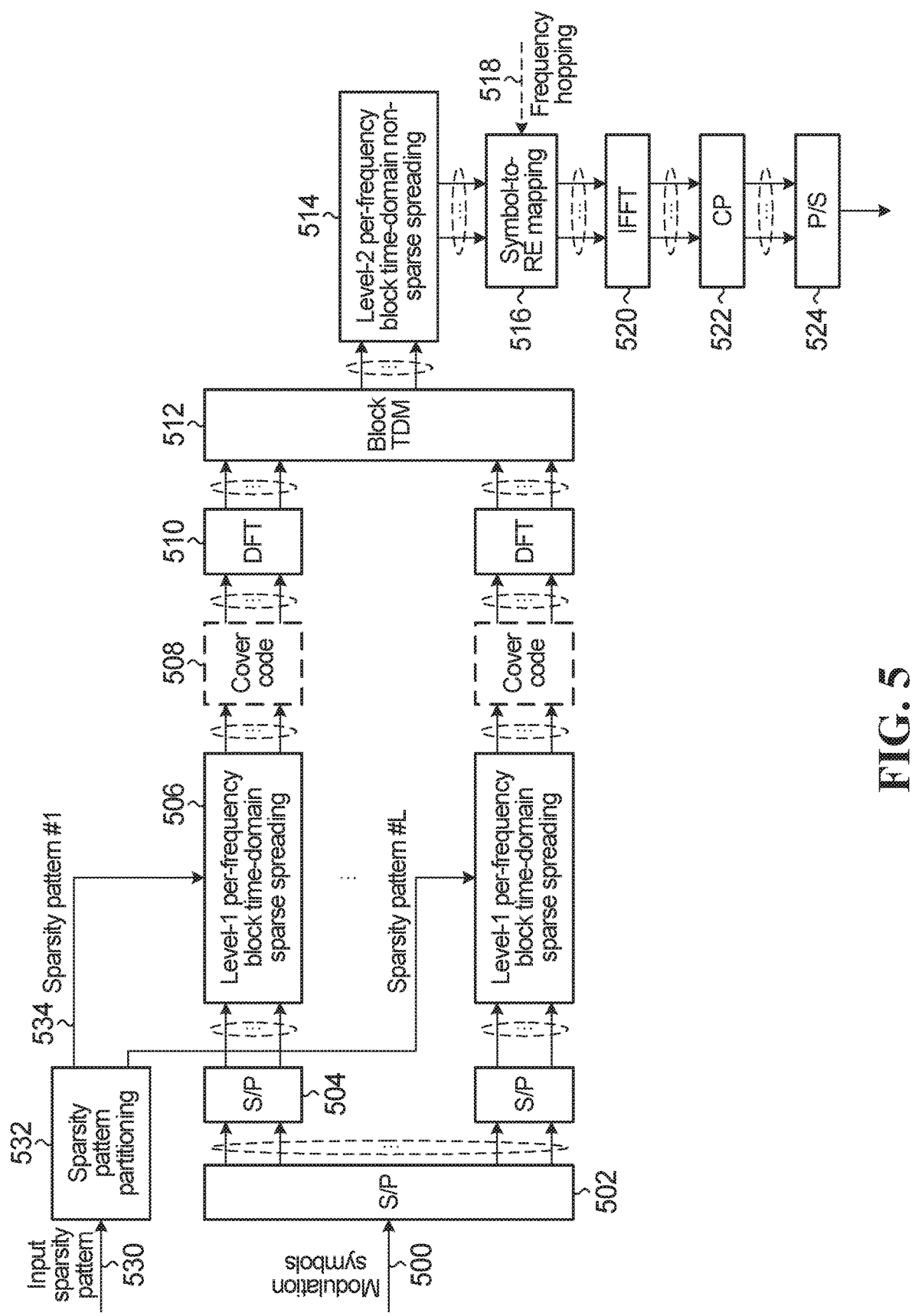
FIG. 5 is a block diagram of an example transmitter configured to implement the provided method.

Referring now to FIG. 5, shown is a block diagram of an embodiment of a transmitter configured to implement the described method of transmission. The block diagram will be described also in the context of a specific example, where L=2, N=4, K=2, J=50. An input stream of modulation symbols 500, typically received in serial, is split into L groups of symbols, or sub-streams, with serial to parallel (S/P) converter 502, where L is the number of sparsity patterns in a complementary group. More specifically, L×K×J symbols are input and split into L sub-streams of J×K symbols. For the specific example, 200 symbols are input and split into 2 sub-streams of 100 symbols.

Each sub-stream is processed by a respective one of L processing paths. The functionality of the first processing path will be described by way of example. The first sub-stream is converted to parallel with S/P converter 504. More specifically, the set of J×K symbols input to the S/P converter 504 is converted to a J parallel outputs each containing K symbols in sequence. Each set of J parallel outputs can be viewed as a sub-block. There will be K sub-blocks produced at the output of S/P converter 504. For the specific example, there will be 2 sub-blocks each containing 50 symbols.

For each of the J parallel outputs containing K symbols, time domain sparse spreading is performed K symbols in level 1 per-frequency block time-domain sparse spreader 506 to produce a corresponding output containing N symbols at a corresponding output of the level-1 per frequency block time domain spreader 506. For the specific example, the output of the level-1 per frequency block time-domain sparse spreading 506 will include J=50 sets of N=4 symbols, equivalently 4 sets of 50 symbols. A different one of the complementary sparsity patterns is used for each of the L processing paths. In some embodiments, a cover code is applied by a cover coder 508. Cover coding is a feature that can be used for expanding the signature space by signature extension.

Subsequently, each set of J outputs containing sparse mapped symbols are DFT spread by DFT block 510. This occurs N times in sequence. For the specific example, there are N=4 sets of J=50 symbols. The first set of 50 is DFT spread, the second set of 50 is DFT spread, the third set of 50 is DFT spread and the fourth set of 50 is DFT spread. Note that two of the four set contain zeros, and the corresponding DFT outputs will be zero. In some embodiments, no DFT need be performed on the sets of zeros. Each of the L processing paths produces a respective sparse spreading block. In a case where the first sparsity pattern is [1 1 0 0] and the second sparsity pattern is [0 0 1 1], consistent with the example of FIG. 1A, the first processing path will produce sparse spreading block 300, where each sub-block $S_1$ and $S_2$ contains J=50 symbols, and the second processing path will produce sparse spreading block 302, where each sub-block $S_3$ and $S_4$ contains J=50 symbols.

The outputs of the L processing paths are blockwise time division multiplexed in block time division multiplexer (TDM) 512. This involves placing the sparse spreading blocks in sequence, for the example, the sparse-spreading blocks are arranged in the time domain as depicted in FIG. 1A.

Next, non-sparse spreading is performed in level-2 per frequency block time-domain non-sparse spreader 514. The output is L non-sparse spreading blocks containing N=4× J=50 outputs, and unlike the case with the DFT outputs, none of the N sets of J outputs are zeros. Referring to the specific example, the output of level-2 per frequency block spreading may appear as in FIG. 2, where there are L=2 non-sparse spreading blocks 308,310, each containing N=4 sets of J=50 symbols. Resulting symbols are mapped to the resource elements (REs) in symbol-to-RE mapper 516. Symbols are converted to the time domain via inverse fast Fourier transform (IFFT) 520 and a cyclic prefix (CP) is added in CP block 522. In some embodiments, frequency hopping is performed by symbol-to-RE mapper 516, taking into account frequency hopping input 518, as described in further detail below. The example of FIG. 5 assumes DFT-s-OFDM waveform, but it can be generalized to other waveforms.

As shown in FIG. 5, the transmitter receives a sequence of modulated symbols 500. The provided scheme can support any modulation symbol such as BPSK, π/2-BPSK, QPSK, π/4-QPSK, 16-QAM, 256-QAM, 1024-QAM etc. In particular, the modulation mapper (not shown in FIG. 5) takes binary digits, 0 or 1, as input and produces complex-valued modulation symbols as output.

In case of π/2-BPSK modulation, bit b(i) is mapped to i-th index complex-valued modulation symbol d(i) according to $$d(i) = \frac{e^{j\frac{\pi}{2}(i \bmod 2)}}{\sqrt{2}}[(1 - 2b(i)) + j(1 - 2b(i))]$$

where $j=\sqrt{-1}$.

In case of BPSK modulation, bit b(i) is mapped to i-th index complex-valued modulation symbol d(i) according to $$d(i) = \frac{1}{\sqrt{2}}[(1 - 2b(i)) + j(1 - 2b(i))]$$

where $j = \sqrt{-1}$.

In case of π/4-QPSK modulation, pairs of bits, b(2i), b(2i+1), are mapped to i-th index complex-valued modulation symbols d(i) according to $$d(i) = \frac{e^{j\frac{\pi}{4}(i \bmod 4)}}{\sqrt{2}}[(1 - 2b(2i)) + j(1 - 2b(2i+1))]$$

where $j = \sqrt{-1}$.

In case of QPSK modulation, pairs of bits, b(2i), b(2i+1), are mapped to i-th index complex-valued modulation symbols d(i) according to $$d(i) = \frac{1}{\sqrt{2}}[(1 - 2b(2i)) + j(1 - 2b(2i+1))]$$

In case of 16QAM modulation, quadruplets of bits, b(4i), b(4i+1), b(4i+2), b(4i+3), are mapped to i-th index complex-valued modulation symbols d(i) according to $$d(i) = \frac{1}{\sqrt{10}}\{(1 - 2b(4i))[2 - (1 - 2b(4i+2))] + j(1 - 2b(4i+1))[2 - (1 - 2b(4i+3))]\}$$

where $j = \sqrt{-1}$.

In case of 64QAM modulation, hextuplets of bits, b(6i), b(6i+1), b(6i+2), b(6i+3), b(6i+4), b(6i+5), are mapped to i-th index complex-valued modulation symbols d(i) according to $$d(i) = \frac{1}{\sqrt{42}}\{(1 - 2b(6i))[4 - (1 - 2b(6i+2))[2 - (1 - 2b(6i+4))]] + j(1 - 2b(6i+1))[4 - (1 - 2b(6i+3))[2 - (1 - 2b(6i+5))]]\}$$

where $j = \sqrt{-1}$.

In case of 256QAM modulation, octuplets of bits, b(8), b(8i+1), b(8i+2), b(8i+3), b(8i+4), b(8i+5), b(8i+6), b(8i+7), are mapped to i-th index complex-valued modulation symbols d(i) according to $$d(i) = \frac{1}{\sqrt{170}}\{(1 - 2b(8i))[8 - (1 - 2b(8i+2))[4 - (1 - 2b(8i+4))[2 - (1 - 2b(8i+6))]]] + j(1 - 2b(8i+1))[8 - (1 - 2b(8i+3))[4 - (1 - 2b(8i+5))[2 - (1 - 2b(8i+7))]]]\}$$

where $j = \sqrt{-1}$.

Some of the modulation types supported by the provided scheme are provided in [3GPP TS 38.211 V16.1.0 (March 2020)]. Note that the above formulas are meant to describe the general concept of the modulation operation. Modulation is an operation that maps bits to the symbols and can therefore be specified in many different ways such as table of bits to symbol mapping etc. Modulation can also be shown by a constellation diagram where an in-phase and quadrature component pair specifies the bit mapping which is a well-known concept in communication engineering.

As described earlier, the symbols input at 500 can be linear/non-linear spread symbols. As described, linear spreading may refer to an operation that creates a relationship between symbols in a sequence of symbols, where the relationship is independent of input bit values of the input bit-stream such that a change in the input values does not affect the relationship between the symbols. NoMA schemes such as MUSA (multi-user shared access), WSMA (Welch bound equality spread multiple access), RSMA (resource spreading multiple access) etc. apply linear spreading technique to obtain a sequence of symbols. Non-linear spreading may refer to an operation that creates a relationship between symbols in a sequence of symbols, where the relationship depends on input bit values of the input bit stream such that different relationships between symbols are formed for different combinations of input bit-values. Non-linear spreading may be referred as multi-dimensional modulation. NoMA schemes such as SCMA (sparse code multiple access) apply non-linear spreading to produce a sequence of symbols.

In some embodiments, the transmitter implements a NoMA scheme where the sparsity patterns contribute to the NoMA signatures. The provided non-orthogonal multiple access scheme has diverse applications, and the number of UEs to be supported can vary significantly. In an massive machine type communication (mMTC) type of application, there is a need to support a large number of UEs while in another application such as enhanced mobile broadband (eMBB)/ultra-reliable low latency communication (URLLC), the number of UEs to be supported can be smaller. In addition, based on the traffic conditions of the systems, the number of UEs to be supported can vary. As such, there is a need for supporting different number of UEs in the system. One approach to achieve a higher UE support without the increasing the sparse spreading length is by using a cover code over the symbols. In one illustrative example, consider the sparse pattern [1,1,0,0] for a UE. As such, two symbols are mapped/spread, $s_1$ and $s_2$. In order to support a larger number of UEs, an MA signature space can be expanded as described below.

Consider the cover code of size two having four possible choices [1,1], [1,-1],[1,j], [1,-j] where $j = \sqrt{-1}$. For a given sparse pattern, the mapping symbols will be multiplied (dot multiplication of non-zero symbols) by a cover code. For example, using the same sparse pattern [1,1,0,0] sparse spread symbols can be one of the four choices $[s_1, s_2,0,0]$, $[s_1,-s_2,0,0]$, $[s_1,js_2,0,0]$, $[s_1,-js_2,0,0]$. The same cover codes can be used by other sparse patterns. Note that cover code multiplication can be expressed in matrix form. The use of cover codes can be configured to a UE by signaling (eg. RRC, MAC-CE or DCI). In the example described with 6 sparse mappings using the Groups 1-3 and 4 cover codes, 24 UE/sparse spreading can be supported. Note that although the sparse spreading is shown per block, the same cover code or multiple cover codes can be used by the multiple sparse spreading blocks. For example, sparse spreading [1,1,0,0], [0,0,1,1] (in that order) from the Group 1 can use the same cover code or different cover codes in the two sparse blocks. In case the cover code [1, 1] is used in two consecutive sparse blocks, sparse spread symbols can be given by $[s_1,s_2,0,0]$, $[0,0,s_3,s_4]$. In another case, different cover codes, for example [1,1] and [1,−1], are used in consecutive sparse blocks of the same group, sparse spread symbol can be given as [$s_1,s_2$,0,0], [0,0,$s_3$,−$s_4$]. Alternatively, a cover code can be applied to the non-sparse spread symbol sequence. For example, after non-sparse spreading a symbol sequence of length 4 of a sparse-block given by [$x_1,x_2,x_3,x_4$] can be multiplied element-wise by a sequence [$\alpha_1, \alpha_2, \alpha_3, \alpha_4$] of length 4 to produce [$\alpha_1 x_1, \alpha_2 x_2, \alpha_3 x_3, \alpha_4 x_4$]. This operation can be referred as symbol scrambling operation on non-sparse spread symbols as well. Signature extension by a cover code and/or symbol scrambling can have additional advantages of inter-cell interference randomization among others. Extending the signature space by using a cover code is detailed in Applicant's copending application number U.S. Ser. No. 15/821,809 hereby incorporated by reference.

Figure 6:
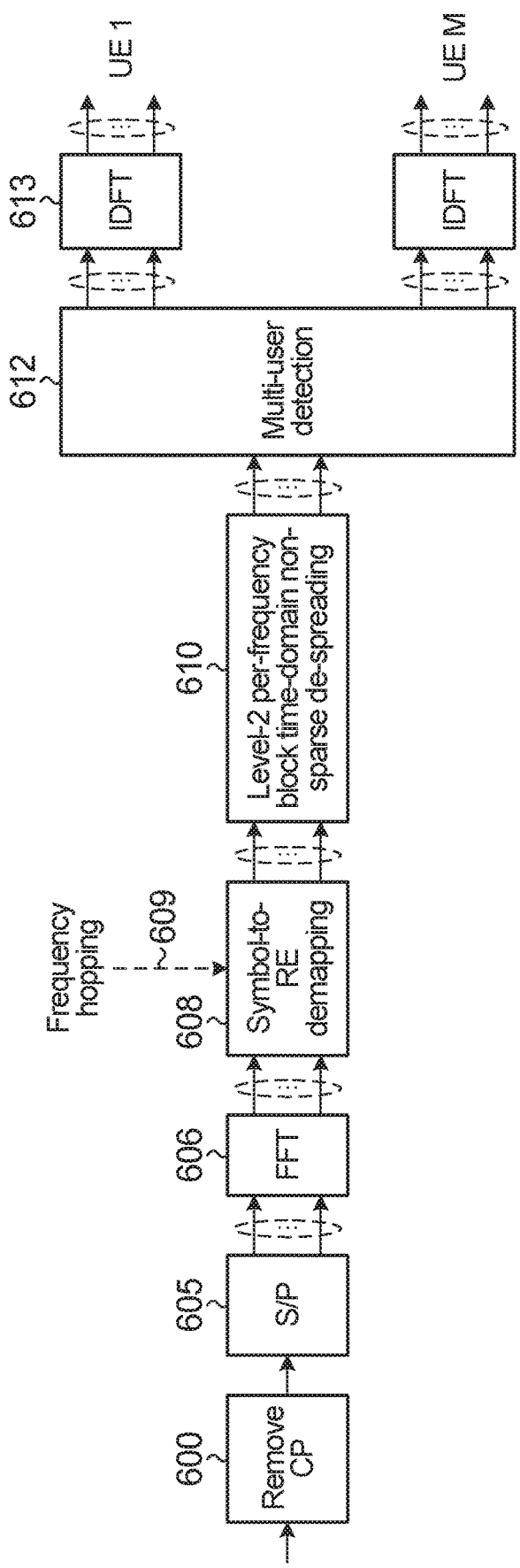
FIG. 6 is a block diagram of an example receiver configured to implement the provided method.

Referring now to FIG. 6, shown is a block diagram of an embodiment of a receiver for receiving signals from multiple transmitters that use the described transmission method. In remove CP block 600, the CP is removed. After serial to parallel conversion in S/P converter 602, the signal is converted to the frequency domain in fast Fourier transform (FFT) 606. RE-to-symbol de-mapping is performed in RE-to-symbol de-mapper 608. In some embodiments, frequency hopping is used by RE-to-symbol de-mapping block based on frequency hopping input 609 which indicates a hopping pattern. Then, per frequency block time-domain non-sparse de-spreading is performed in level-2 per-frequency block time-domain de-spreader 610. This will bring the received signal to a form composed of sparse symbols which can be passed to multi-user detection block 612 which can perform multi-user detection based on sparsity patterns. If signature extension is being used, such extension will be taken care by the multi-user detector 612. After multi-user detection, each UE received signal will be passed to a respective IDFT block 614 which will perform IDFT de-spreading. Subsequently, decoding is performed to obtain the transmitted bits (not shown). More generally, after de-spreading, such as in block 610, further processing is performed in the sparse domain.

The provided scheme can be implemented in multiple different ways. For example, sparse spreading and non-sparse spreading can be done in a single module. In another example, the sparse spreading can be a specific implementation of symbol interleaving. For example, using sparse patterns [1,1,0,0],[0,0,1,1] that produce symbols [$s_1,s_2$,0,0], [0,0,$s_3,s_4$] can be viewed as a specific way of symbol interleaving. For example, symbols $s_1,s_2,s_3,s_4$ are padded with four zero symbols, i.e., $s_1, s_2, s_3, s_4$,0,0,0,0 and interleaved to obtain the symbol sequence $s_1, s_2$, 0,0,0,0, $s_3, s_4$ and mapped to the REs in time domain. This will have the same effect of combined operations of sparse spreading and non-sparse spreading as described before for sparse patterns [1,1,0,0], [0,0,1,1] (in that order) in Group 1. Note that signature extension can be viewed as a symbol level scrambling operation. For example, the use of cover code [1,−1] on both sparse blocks can be viewed as scrambling the symbol sequence $s_1,s_2,s_3,s_4$ by scrambling sequence 1, −1, 1, −1 to produce a sequence of symbols $s_1$, −$s_2$, $s_3$, −$s_4$. The symbol scrambling can also be defined for an interleaved symbol sequence or the non-sparse symbol sequence. In another implementation, the choice of sparse patterns that satisfy the complementary sparse pattern condition can be viewed as sparse pattern hopping where hopped sparse patterns need to satisfy the condition. For example, sparse patterns [1,1,0,0],[0,0,1,1] can be implemented as hopping from first sparse pattern [1,1,0,0] to the next sparse pattern [0,0,1,1]. In another example, sparse patterns [1,1,0,0], [0,0,1,1], [0,1,1,0], [1,0,0,1] can be viewed as a sparse hopping pattern of 4 patterns where consecutive pairs of sparse patterns, i.e., sparse pattern (1,2) and (3,4) satisfying the complementary sparse pattern condition.

As referenced above, in some embodiments frequency hopping is employed. With frequency hopping, multiple symbols can be transmitted over frequency bands which are frequency localized or distributed (non-overlapping frequency domain REs). Using multiple frequency blocks provides the benefits of frequency diversity and an additional dimension for signature space extension to support a larger number of UEs.

Figure 7:
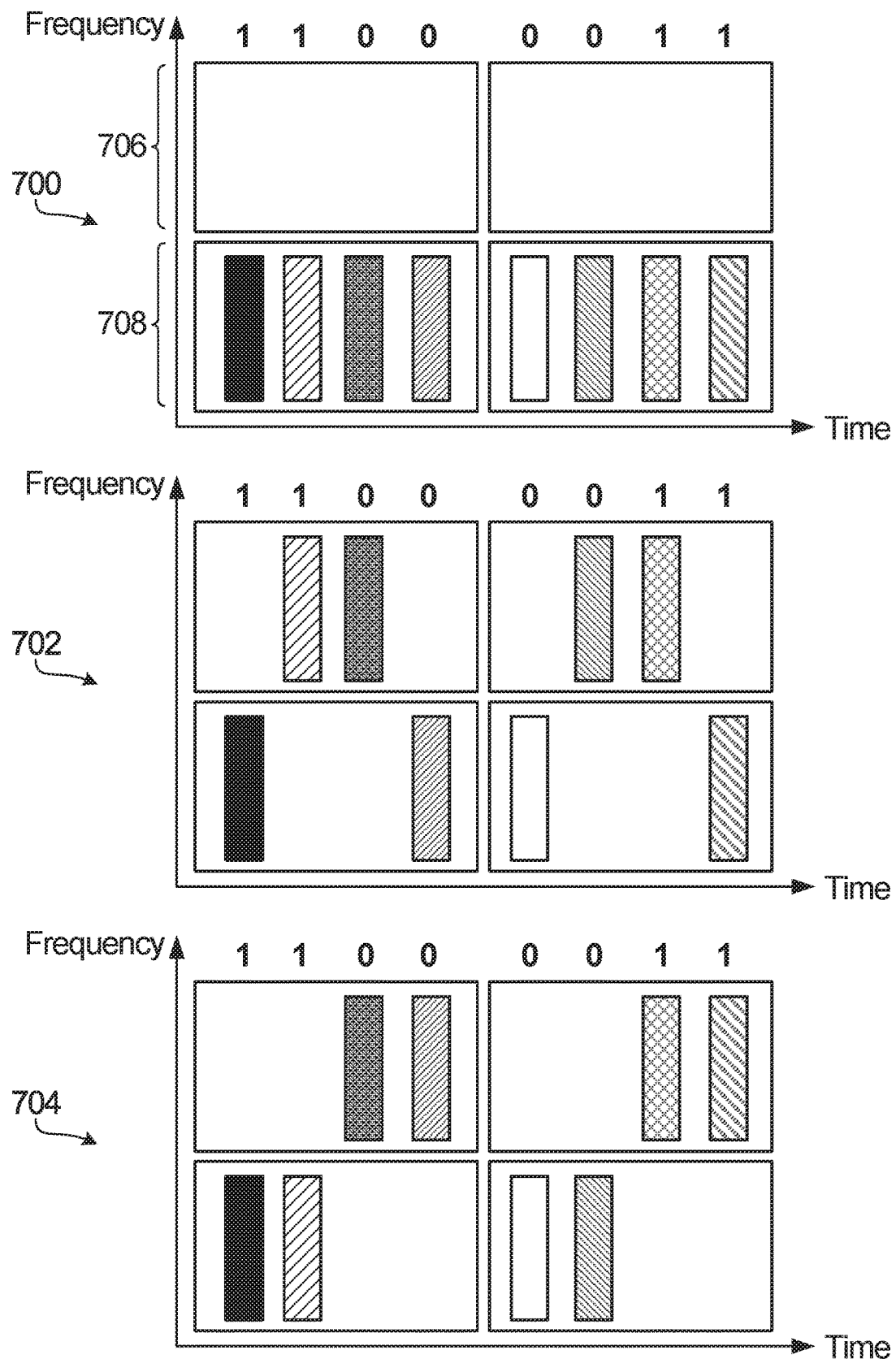
FIGS. 7, 8A and 8B show examples of the provided method with additional frequency hopping.

Using two frequency partitions, and using sparsity patterns [1,1,0,0], [0,0,1,1] in that order from Group 1 described previously, three example hopping patterns 700, 702,704 are shown in FIG. 7. In FIG. 7, there are 2 frequency partitions 706,708. More generally, there are maximum of $B^N$ number of hopping patterns supported where B is the number of frequency partitions. Recall N is the length of the sparsity patterns. Note that non-sparse time domain symbols derived from non-sparse spreading of the same input symbol are mapped to the same frequency block. This is to make sure that such symbols experience similar channel coefficients for de-spreading at the receiver side. In the first pattern 700, only the second frequency partition 708 is used. In the second pattern 702, the first frequency partition 706 is used for the second and third sub-blocks of symbols, and the second frequency partition is used for the first and fourth sub-blocks of symbols.

By using frequency hopping together with multiple sparsity patterns in each group, a large of number UEs can be supported. For example, there are $$\binom{N}{K}$$

number of sparsity patterns and with a B number of frequency partitions, a number $B^N$ of hopping patterns can be defined per sparsity pattern. The hopping patterns may be down selected (only a subset of hopping patterns out of $B^N$ of possible hopping patterns) to meet system performance metric such as BLER. Such sparsity patterns can be extended by using a cover code. For example, a set of two cover codes [1,1], [1,−1] can increase the signature space in the N=4 and K=2 example described above by two times. Alternatively, set of four cover codes [1,1], [1,−1], [1,j], [1,−j] can increase the signature space by four times.

Figure 8A:
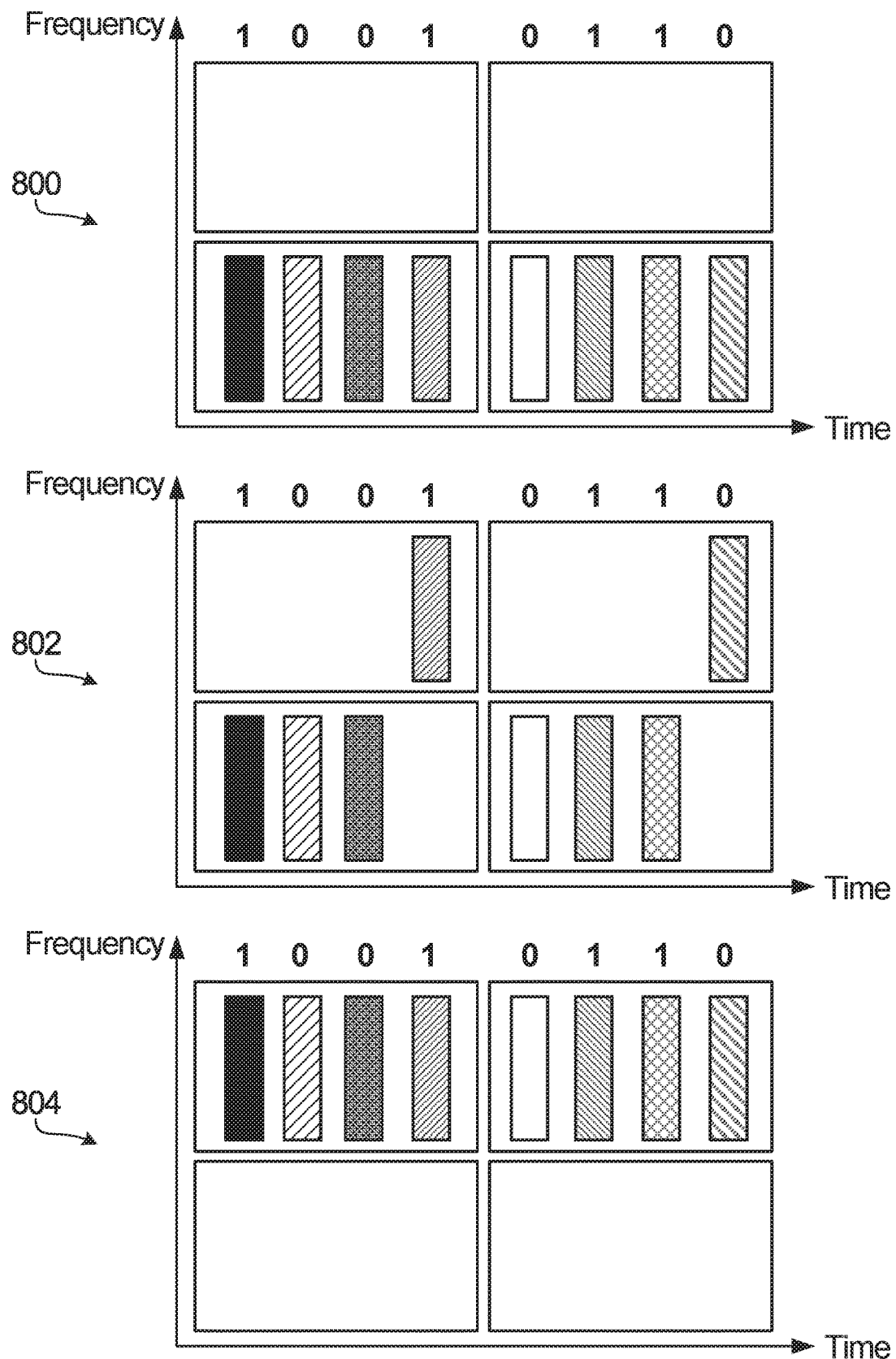

Another example of frequency hopping using sparsity patterns [1,0,0,1], [0,1,1,0] in that order is shown in FIG. 8A. Only three patterns shown out of 16 possible hopping patterns.

Figure 8B:
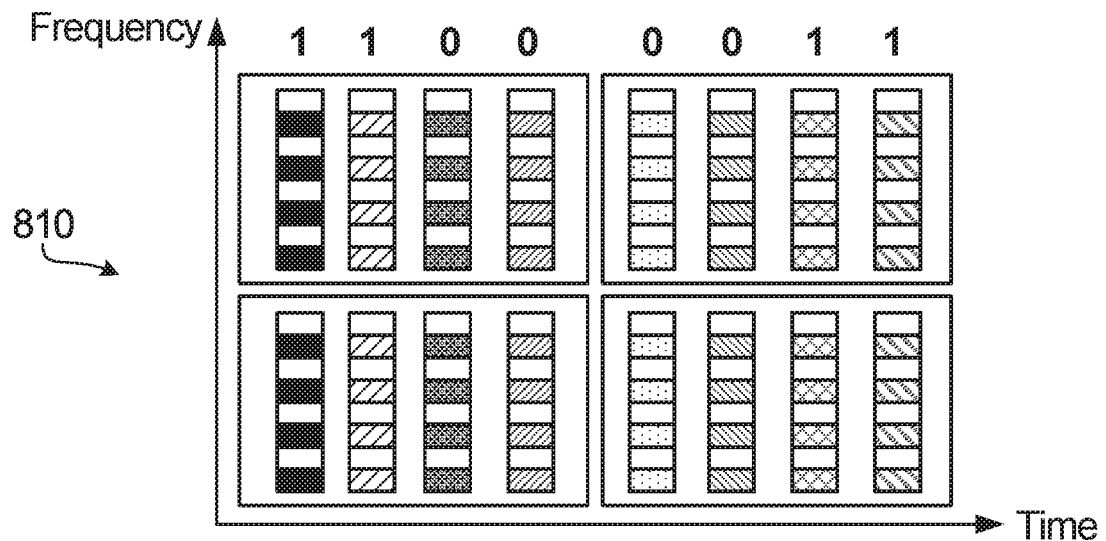
Figure 8B:
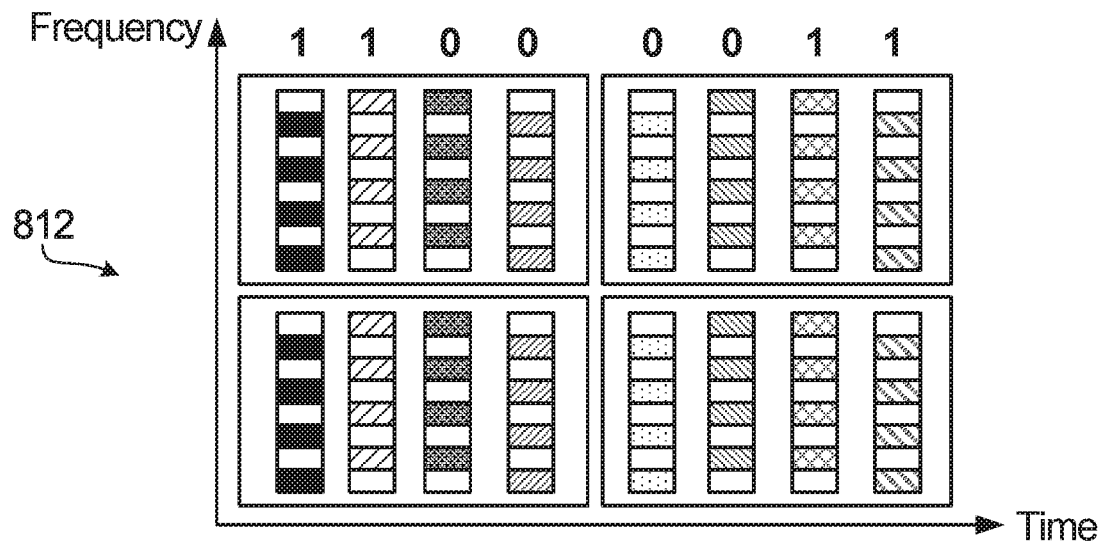

Furthermore, in some embodiments, each sub-block of symbols in frequency can map using a comb structure. This helps to exploiting frequency diversity of the channel. An example is shown in FIG. 8B which shows two examples 810, 812. In example 810, all sub-blocks of symbols use the same comb structure for symbol mapping in frequency, whereas in example 812, the second and third sub-blocks of symbols in a first sparse block and in a second sparse block uses a different comb structure. In order to achieve good performance in non-sparse de-spreading, corresponding symbols in each block are expected to use the same comb structure. Therefore, similar to non-comb based frequency hopping, comb based frequency hopping can extend the number of supported UEs while achieving frequency diversity.

In the above described example in which N=4 and K=2, the sparsity patterns {[1,1,0,0], [0,0,1,1]} satisfy the complementary sparsity pattern condition and therefore belongs to the same group. Similarly, the sparsity patterns {[1,0,1,0], [0,1,0,1]} also satisfies this condition and belongs to the same group. Taking another example, N=6 and K=2, sparsity patterns {[1,1,0,0,0,0], [0,0,1,1,0,0], [0,0,0,0,1,1]} satisfies the complementary sparsity pattern condition and belongs to the same group. An example of a complete set of groups for this example is shown in FIG. 9.

In general, partitioning the sparsity pattern space with spreading length N and K non-sparse elements, there are total of $$\binom{N}{K}$$

sparsity patterns and $$\binom{N-1}{K-1}$$

groups with L=N/K sparsity patterns in each group. Sparsity patterns in each group satisfy the complementary sparsity pattern condition.

Alternatively, the complementary sparsity pattern condition can be expressed as below. The sparsity patterns in a group should sum to the all non-zero sparsity pattern, i.e., for sparsity patterns $v_i$ belongs to group $G_j$, then $\Sigma_{\forall i} v_i = 1$, where $v_i \in G_j$ and 1 is the vector of all 1s. For example, [1,1,0,0]+[0,0,1,1]=[1,1,1,1] and therefore, sparsity patterns {[1,1,0,0], [0,0,1,1]} belongs to the same group.

In the general case, the sparsity patterns have length N, each sparsity pattern has K non-zero elements, K divides into N evenly, and the set of sparsity patterns includes N/K patterns. The set of input symbols contains N symbols, a respective disjoint size K subset of which is mapped to each sparsity pattern of the set of sparsity patterns.

Performing non-sparse spreading across the set of sparse spreading blocks to produce a set of non-sparse spreading blocks involves, for each sparse spreading block, mapping each non-zero symbol of the sparse spreading block to a correspondingly positioned zero symbol in each other sparse spreading block. Mapping coefficients from a respective row or column of a unitary matrix are used in the mapping of each sparse spreading block.

In some embodiments, signalling schemes related to the described transmission scheme are provided. These may be applied to uplink, downlink and side-link scenarios. The UE may be in RRC_CONNECTED, RRC_INACTIVE or RRC_IDLE state. The transmission can be grant-free (e.g. UE selects the transmission resources and/or time to transmit/transmit occasion), configured-grant or scheduled. The details can be signaled from DCI/UCI, MAC-CE or RRC signaling.

Figure 10:
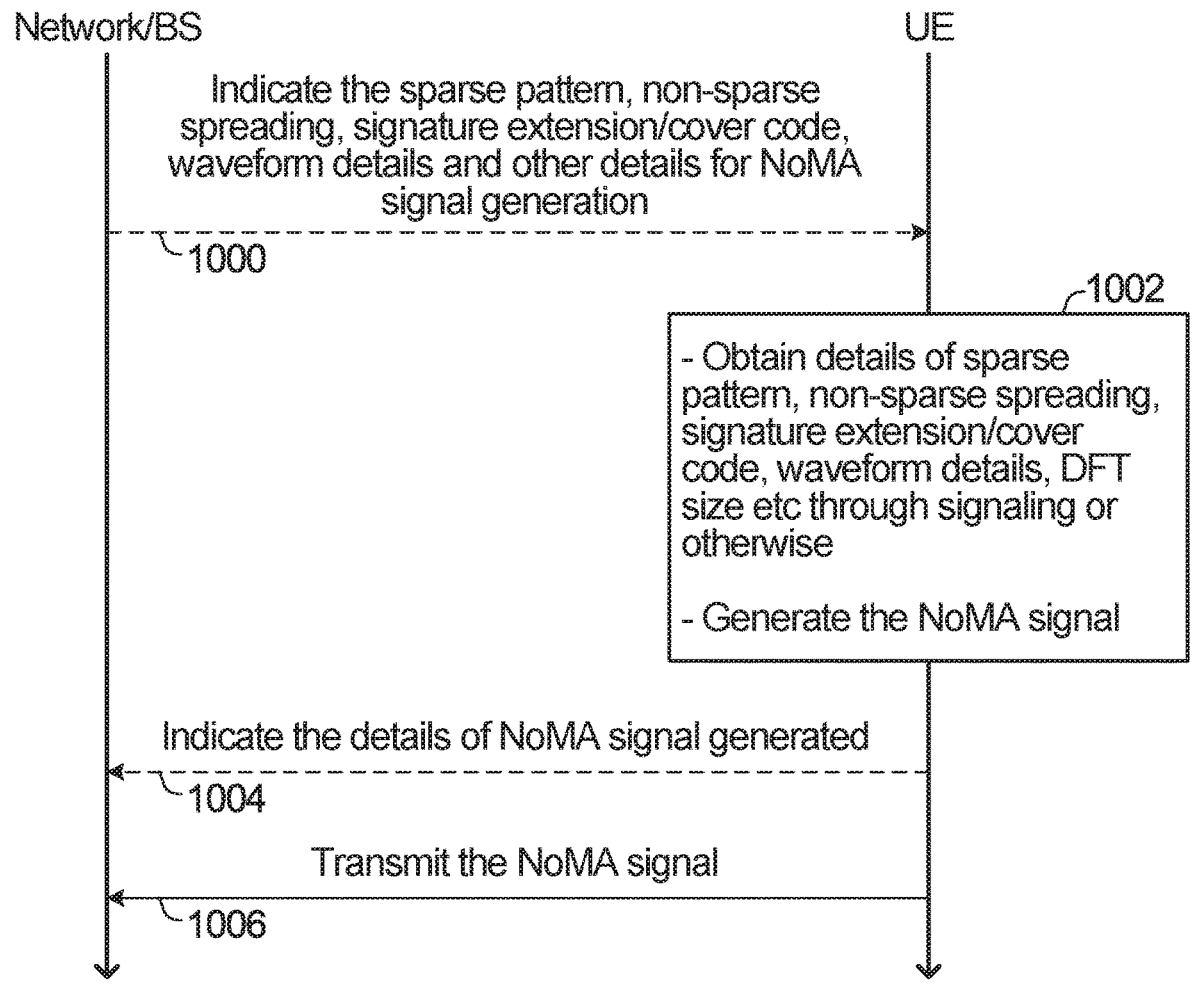
FIGS. 10 to 12 are examples of signaling schemes.

An example of signalling for an uplink scenario is depicted in FIG. 10, where the signal generated is transmitted from UE/Device to the network/BS side. In this scenario, BS/Network side may indicate, at 1000, to the UE/Device side the transmission parameters and configurations which includes (not limited to) transmission physical resources, sparse pattern details (eg. N, K, group index, pattern index etc), non-sparse spreading details (eg. Non-sparse spreading Unitary matrix), details of signature extension (eg. Signature extension is enabled/disabled, specific signature extension/index to be used etc), waveform details (Eg. DFT-s-OFDM, DFT spreading details, FDSS enable/disable, FDSS details etc), frequency hopping details (Eg. Frequency hopping enable/disable, frequency hopping details such as size of frequency blocks used, hopping pattern details etc). In some embodiments, only the sparse spreading is performed and in another, both sparse spreading and non-sparse spreading is enabled. Some configurations or parameters can be derived. For example, FDSS filter to be used may derived/implied from the DFT spreading size. In some other embodiments, modulation order (such as BPSK, π/2−BPSK etc) imply that certain waveform such as DFT-s-OFDM to be enabled.

Based on the received information from the BS/network side or implied/derived from the available information, the UE generates the NoMA signal to be transmitted from the UE side to the BS/Network side at 1002. Some information (parameters/configuration etc) used by the UE side can optionally be indicated to the BS/Network side at 1004. The UE transmits the NoMA signal at 1006.

Figure 11:
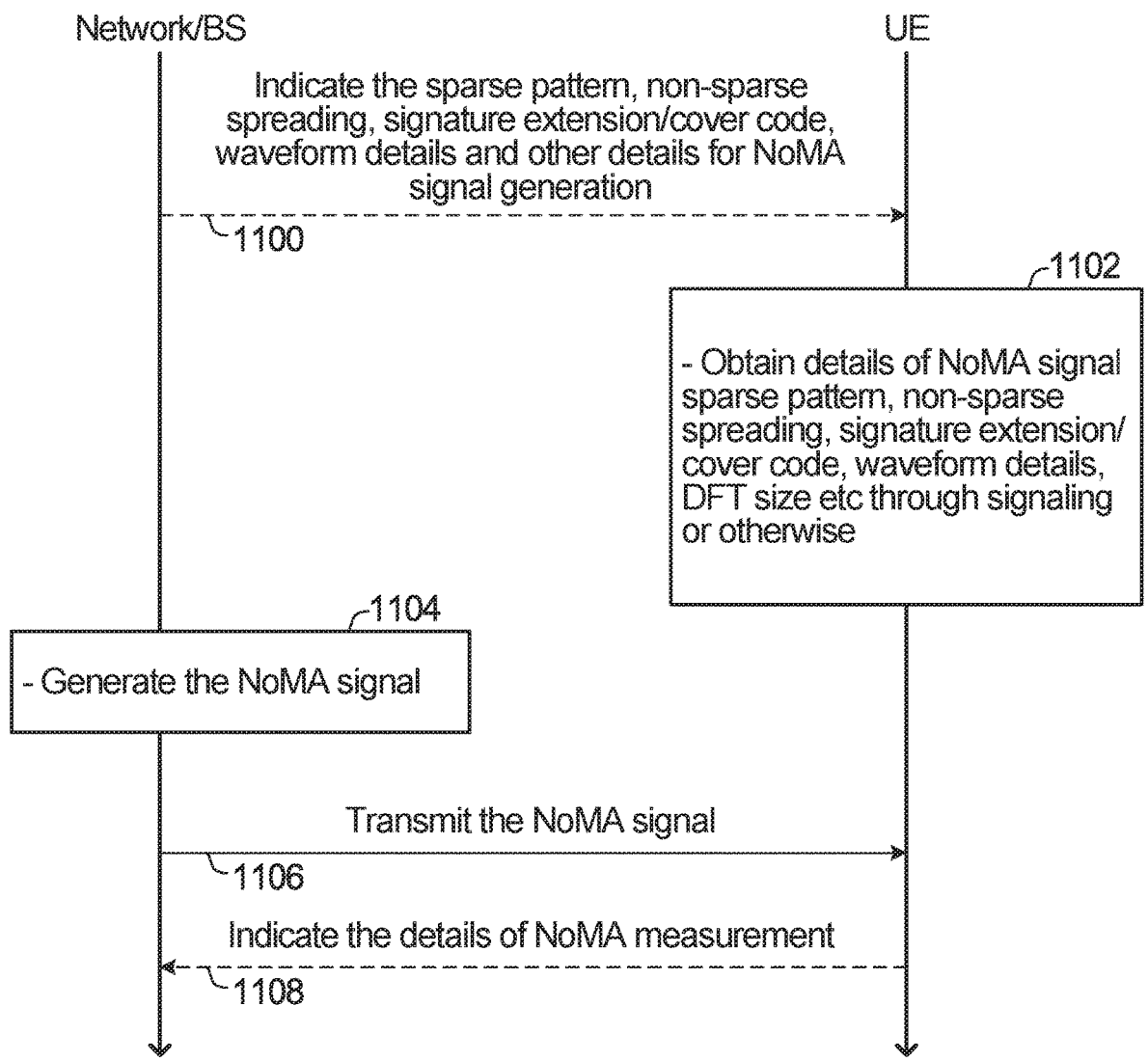

In another embodiment, as shown in FIG. 11, the NoMA signal transmission is performed in a downlink scenario where the transmission takes place from the BS/Network side to the UE/device side. In this scenario, BS/Network side may indicate, at 1100, to the UE/Device side the transmission parameters and configurations which includes (not limited to) transmission physical resources, sparse pattern details (e.g. N, K, group index, pattern index etc), non-sparse spreading details (eg. Non-sparse spreading Unitary matrix), details of signature extension (eg. Signature extension is enabled/disabled, specific signature extension/index to be used etc), waveform details (Eg. DFT-s-OFDM, DFT spreading details, FDSS enable/disable, FDSS details etc), frequency hopping details (e.g. Frequency hopping enable/disable, frequency hopping details such as size of frequency blocks used, hopping pattern details etc). In some embodiments, only the sparse spreading is performed and in another, both sparse spreading and non-sparse spreading is enabled. Some configurations or parameters can be derived. For example, FDSS filter to be used may derived/implied from the DFT spreading size. In some other embodiments, modulation order (such as BPSK, π/2−BPSK etc) imply that certain waveform such as DFT-s-OFDM to be enabled. The UE receives these parameters and configurations or otherwise obtains them at 1102.

At 1104, the BS/network side generates the NoMA signal to be transmitted from the BS/network side to the UE side, and transmits the signal at 1106. Based on the received information from the BS/network side or implied/derived from the available information, UE side performs the decoding/detection. Some information (measurements such as SINR, channel quality etc.) can optionally be indicated to the BS/Network side at 1108.

Figure 12:
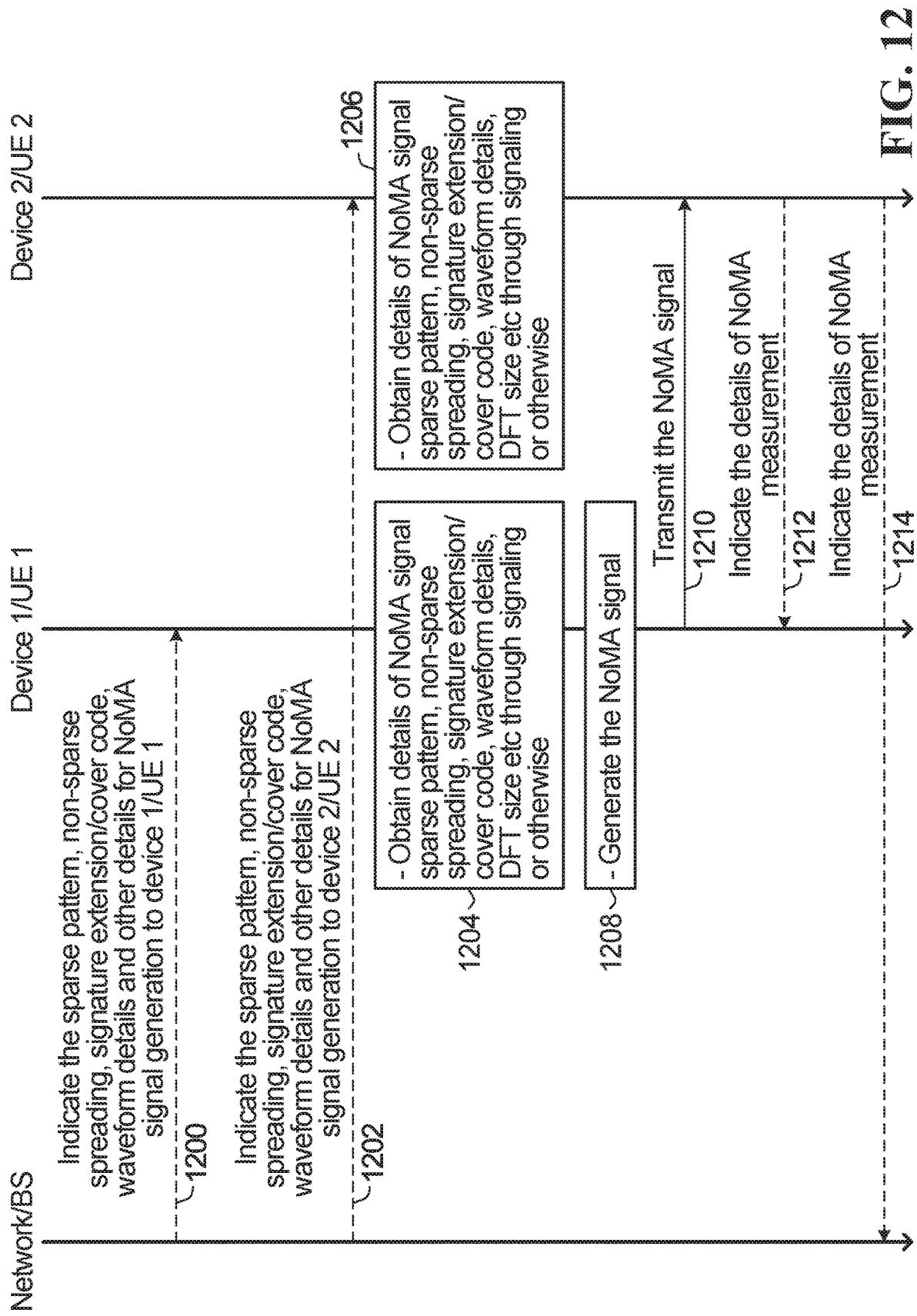

In another embodiment, as shown in FIG. 12, the NoMA signal transmission is performed in a sidelink scenario where the transmission takes place from one device/UE to another UE/device. In this scenario, BS/Network side may indicate, at 1200 and 1202, to the one or more UE/Device side the transmission parameters and configurations which includes (not limited to) transmission physical resources, sparse pattern details (eg. N, K, group index, pattern index etc), non-sparse spreading details (eg. Non-sparse spreading Unitary matrix), details of signature extension (eg. Signature extension is enabled/disabled, specific signature extension/ index to be used etc), waveform details (e.g. DFT-s-OFDM, DFT spreading details, FDSS enable/disable, FDSS details etc), frequency hopping details (e.g. Frequency hopping enable/disable, frequency hopping details such as size of frequency blocks used, hopping pattern details etc). In some embodiment, the transmitter UE/Device may indicate to the receiver side UE/Device some of the transmit parameters/ configurations similar to BS/Network side (not shown in FIG. 12). In some embodiments, only the sparse spreading is performed and in another, both sparse spreading and non-sparse spreading is enabled. Some configurations or parameters can be derived. For example, FDSS filter to be used may derived/implied from the DFT spreading size. In some other embodiments, modulation order (such as BPSK, $\pi/2$–BPSK etc) imply that certain waveform such as DFT-s-OFDM to be enabled. The two UE receive or otherwise obtain the parameters and configurations at 1204 and 1206.

At 1208, one UE/Device side generates the NoMA signal to be transmitted to another UE/Device side, and transmits this at 1210. Based on the received information from the BS/network side or implied/derived from the available information, UE side performs the decoding/detection. Some information (measurements such as SINR, channel quality etc) can optionally be indicated to the BS/Network side at 1214 or transmitter UE/Device at 1212.

Figure 13:
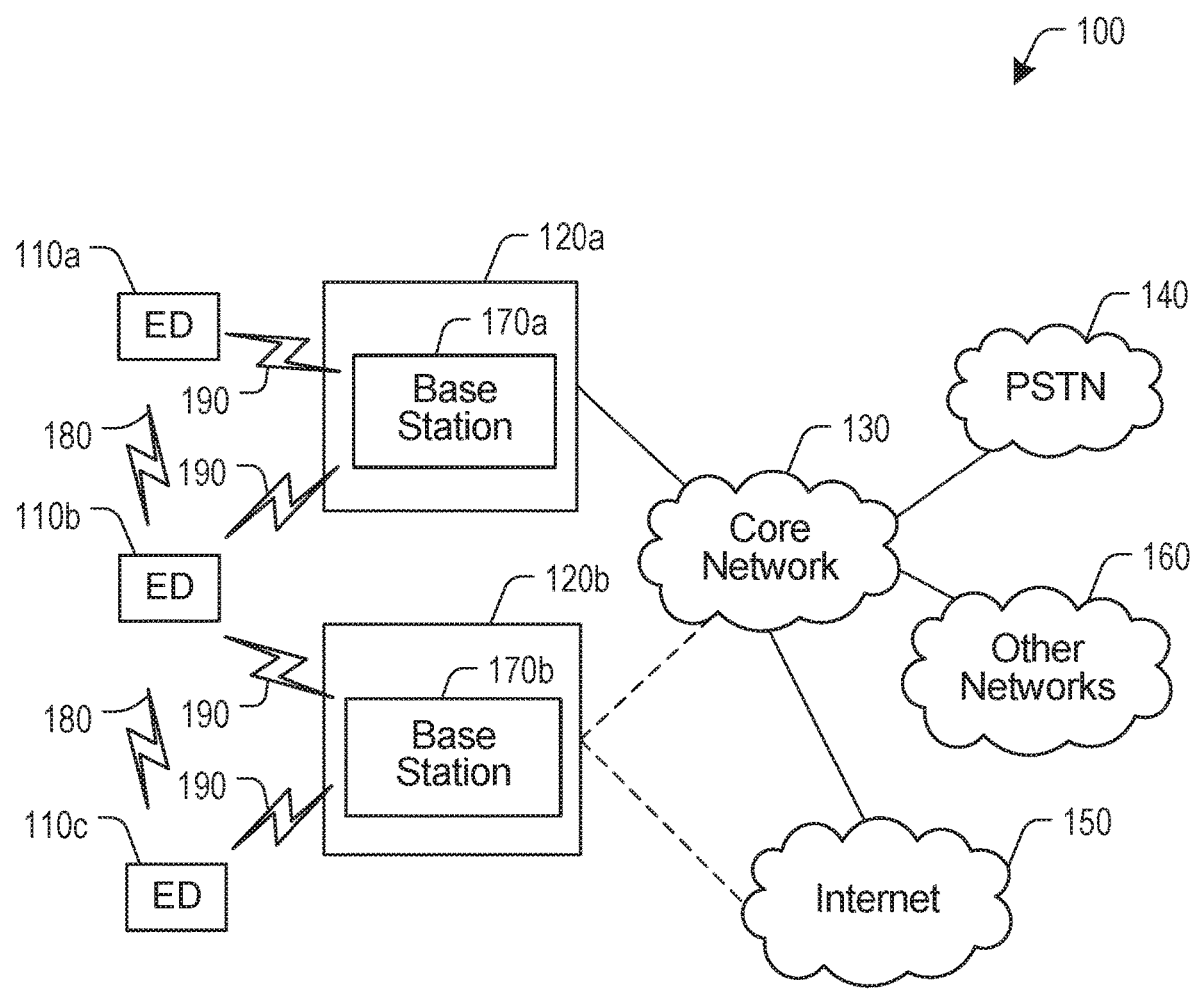
FIG. 13 shows an example of a network for implementing one or more embodiments of the disclosure.

FIG. 13 illustrates an example communication system 100 in which embodiments of the present disclosure may be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 13, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, consumer electronics device, Internet of Things (IoT) device, wearable device, or vehicular device (or vehicle-mounted device, vehicle on-board equipment).

In FIG. 13, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown. The detailed embodiments described herein make reference to TPs, but more generally, any type of base station can be used for any of the embodiments described herein.

The EDs 110a-110c and base stations 170a-170b are examples of communication equipment that can be configured to implement some or all of the functionality and/or embodiments described herein. In the embodiment shown in FIG. 13, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/ or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, LTE-B and/or New Radio (NR). It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such.

Figure 14A:
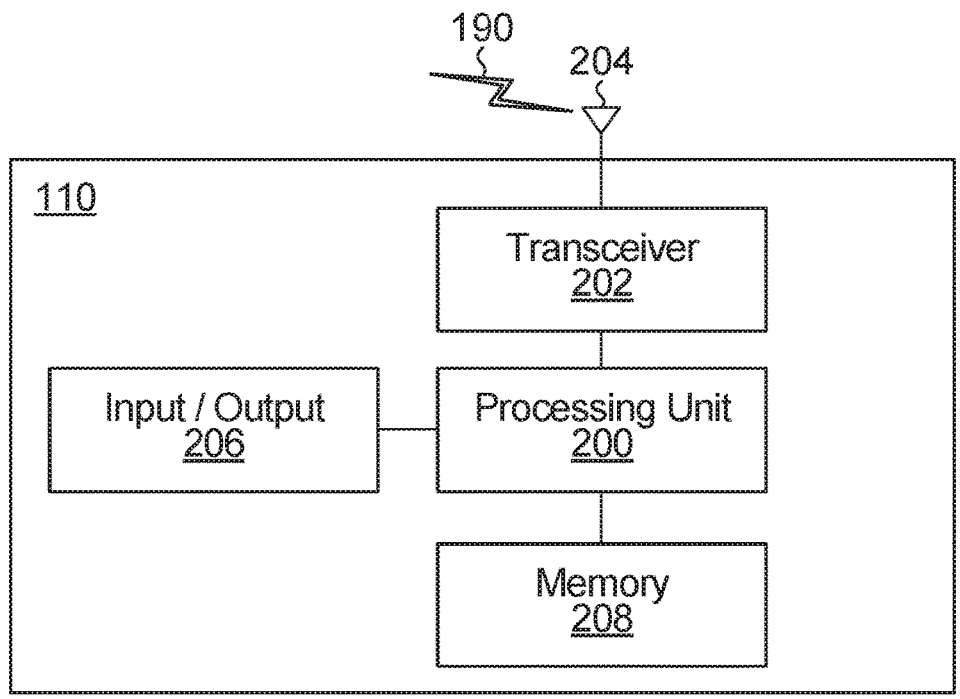
FIG. 14A is a block diagram of an example electronic device.
Figure 14B:
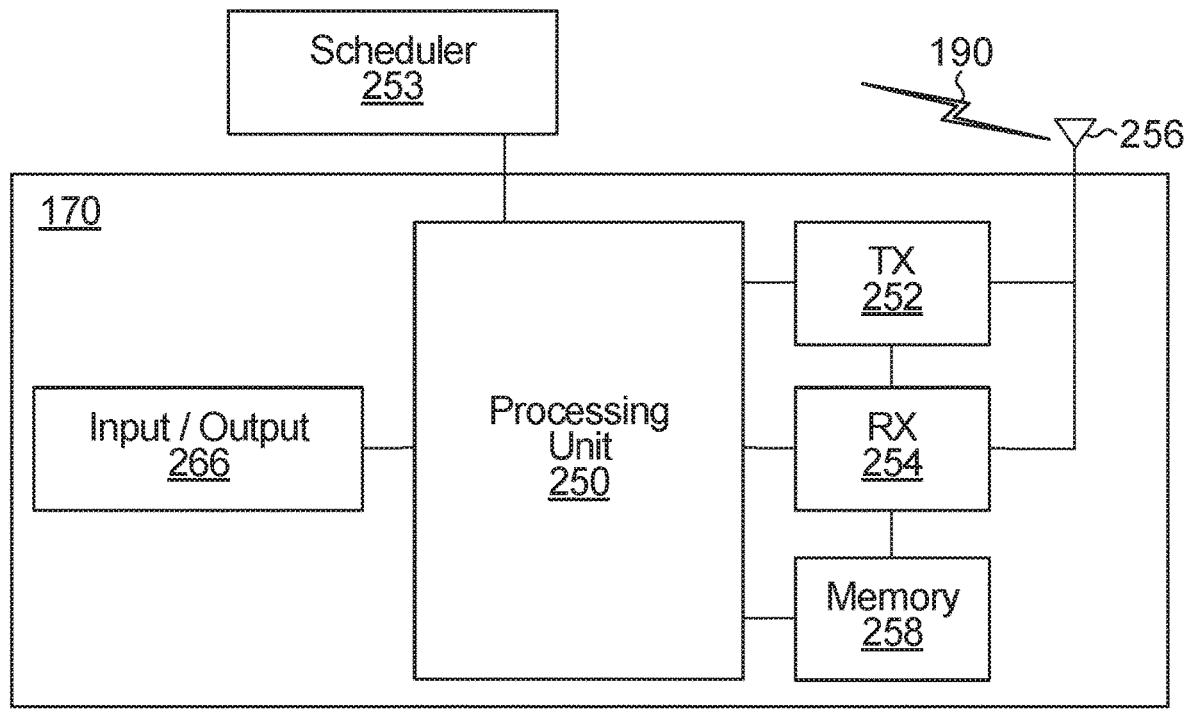
FIG. 14B is a block diagram of an example electronic device.

FIG. 14A and FIG. 14B illustrate example devices that may implement the methods and teachings according to this disclosure. In particular, FIG. 14A illustrates an example ED 110, and FIG. 11B illustrates an example base station 170. These components could be used in the communication system 100 or in any other suitable system. For example, the ED of FIG. 14A may implement the functionality of FIG. 5 and/or that of FIG. 6. The base station of FIG. 14B may implement the functionality of FIG. 5 and/or that of FIG. 6.

As shown in FIG. 14A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Some of the embodiments and examples described above may also be applied to other applications and scenarios as well. For example, the provided approaches may be applied to satellite communication, Internet of Vehicle (IoV), Internet of Things (IoT), and device to device communication (including side link). The provided transmission scheme allows for low-PAPR transmission while having provisions for better collision handling (interference mitigation) by sparse domain mapping. The low-PAPR is an attractive feature in many applications where a device needs to be power efficient, and where a device needs to have low-cost/complexity hardware. For example, a transmitter in applications such as IoT, IoV, and satellite links (eg. From ground to satellite link), the device power efficiency, low-cost and low distortion from non-linearity in the power amplifier are critical and can be supported by a low-PAPR transmission scheme. The protection from collisions is another attractive feature in many applications where the fact that collisions are allowed, and a collision mitigation approach is in place, allows for an overall system design that is simpler and/or has improved spectral efficiency. For example, this would be of benefit for a device such as a transmitter in IoT, IoV, satellite applications where the fact that collisions can be allowed a mitigated may reduce the amount of central control or signaling required, avoiding the associated signaling overhead.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
dividing a set of input symbols to be transmitted into L sets of input symbols, where L is an integer $\geq 2$;
applying time-domain sparse spreading to each of the L sets of input symbols, by using a respective one of a set of L sparsity patterns to produce a respective sparse spreading block, each sparsity pattern having an equal number of positions to which input symbols are mapped, the set of sparsity patterns being such that only one sparsity pattern maps to each position;
applying non-sparse spreading in a time domain based on the sparse spreading blocks to produce a set of non-sparse spreading blocks; and
transmitting a signal based on the set of non-sparse spreading blocks.

2. The method of claim 1, wherein:
each of the L sets of input symbols comprises J sets of K symbols, where $J \geq 1$;
for each of the L sets of input symbols, applying time-domain sparse spreading comprises:
applying the respective sparsity pattern to each of the J sets of K symbols to produce a respective one of J sparse sequences of N symbols, the J sparse sequences of N symbols collectively comprising the respective sparse spreading block;
where J is the size of a frequency dimension of the sparse spreading blocks, $K \geq 1$, and $N > K$.

3. The method of claim 2 further comprising:
applying a linear transformation to the sparse spreading blocks to produce linearly transformed sparse spreading blocks;
wherein applying non-sparse spreading in the time domain based on the sparse spreading blocks to produce the set of non-sparse spreading blocks comprises applying non-sparse spreading to the set of linearly transformed sparse spreading blocks.

4. The method of claim 3 wherein applying a linear transformation comprises applying a discrete Fourier transform (DFT) having size J.

5. The method of claim 1 further comprising applying a cover code to the sparse spreading blocks.

6. The method of claim 1 further comprising:
applying frequency hopping among a plurality of frequency resources to the set of non-sparse spreading blocks, wherein symbols of the non-sparse spreading blocks that are derived from a same symbol of the set of input symbols use a same frequency resource of the plurality of frequency resources.

7. The method of claim 1 wherein:
each sparse spreading block includes a zero sub-block corresponding to each position in the sparsity pattern to which symbols are not mapped and a non-zero sub-block corresponding to position in the sparsity pattern to which symbols are mapped;
performing non-sparse spreading based on the sparse spreading blocks to produce a set of non-sparse spreading blocks comprises:
for each sparse spreading block, mapping each non-zero sub-block of the sparse spreading block to a correspondingly positioned zero sub-block in each other sparse spreading block;
wherein mapping coefficients from a respective row or column of a unitary matrix are used in the mapping of each sparse spreading block.

8. The method of claim 1 further comprising performing discrete Fourier transform-spread-orthogonal frequency division modulation (DFT-S-OFDM) on the input symbols.

9. An apparatus comprising:
a processor and a memory;
wherein the apparatus configured to perform a method comprising:
dividing a set of input symbols to be transmitted into L sets of input symbols, where L is an integer $\geq 2$;
applying time-domain sparse spreading to each of the L sets of input symbols, by using a respective one of a set of L sparsity patterns to produce a respective sparse spreading block, each sparsity pattern having an equal number of positions to which input symbols are mapped, the set of sparsity patterns being such that only one sparsity pattern maps to each position;
applying non-sparse spreading in a time domain based on the sparse spreading blocks to produce a set of non-sparse spreading blocks; and
transmitting a signal based on the set of non-sparse spreading blocks.

10. The apparatus of claim 9, wherein:
each of the L sets of input symbols comprises J sets of K symbols, where $J \geq 1$;
for each of the L sets of input symbols, applying time-domain sparse spreading comprises:
applying the respective sparsity pattern to each of the J sets of K symbols to produce a respective one of J sparse sequences of N symbols, the J sparse sequences of N symbols collectively comprising the respective sparse spreading block;
where J is the size of a frequency dimension of the sparse spreading blocks, $K \geq 1$, and $N > K$.

11. The apparatus of claim 10 wherein the apparatus is further configured to:
- apply a linear transformation to the sparse spreading blocks to produce linearly transformed sparse spreading blocks;
- wherein applying non-sparse spreading in the time domain based on the sparse spreading blocks to produce the set of non-sparse spreading blocks comprises applying non-sparse spreading to the set of linearly transformed sparse spreading blocks.

12. The apparatus of claim 11 wherein applying a linear transformation comprises applying a discrete Fourier transform (DFT) having size J.

13. The apparatus of claim 9 wherein the apparatus is further configured to apply a cover code to the sparse spreading blocks.

14. The apparatus of claim 9 wherein the apparatus is further configured:
- apply frequency hopping among a plurality of frequency resources to the set of non-sparse spreading blocks, wherein symbols of the non-sparse spreading blocks that are derived from a same symbol of the set of input symbols use a same frequency resource of the plurality of frequency resources.

15. The apparatus of claim 9 wherein:
- each sparse spreading block includes a zero sub-block corresponding to each position in the sparsity pattern to which symbols are not mapped and a non-zero sub-block corresponding to position in the sparsity pattern to which symbols are mapped;
- performing non-sparse spreading based on the sparse spreading blocks to produce a set of non-sparse spreading blocks comprises:
- for each sparse spreading block, mapping each non-zero sub-block of the sparse spreading block to a correspondingly positioned zero sub-block in each other sparse spreading block;
- wherein mapping coefficients from a respective row or column of a unitary matrix are used in the mapping of each sparse spreading block.

16. The apparatus of claim 9 wherein the apparatus is further configured to perform discrete Fourier transform-spread-orthogonal frequency division modulation (DFT-S-OFDM) on the input symbols.

17. A non-transitory computer readable medium having instructions stored thereon that when executed by a processor cause execution of a method comprising:
- dividing a set of input symbols to be transmitted into L sets of input symbols, where L is an integer $\geq 2$;
- applying time-domain sparse spreading to each of the L sets of input symbols, by using a respective one of a set of L sparsity patterns to produce a respective sparse spreading block, each sparsity pattern having an equal number of positions to which input symbols are mapped, the set of sparsity patterns being such that only one sparsity pattern maps to each position;
- applying non-sparse spreading in a time domain based on the sparse spreading blocks to produce a set of non-sparse spreading blocks; and
- transmitting a signal based on the set of non-sparse spreading blocks.

18. The non-transitory computer readable medium of claim 17, wherein:
- each of the L sets of input symbols comprises J sets of K symbols, where $J \geq 1$;
- for each of the L sets of input symbols, applying time-domain sparse spreading comprises:
- applying the respective sparsity pattern to each of the J sets of K symbols to produce a respective one of J sparse sequences of N symbols, the J sparse sequences of N symbols collectively comprising the respective sparse spreading block;
- where J is the size of a frequency dimension of the sparse spreading blocks, $K \geq 1$, and $N > K$.

19. The non-transitory computer readable medium of claim 18 wherein the method further comprises:
- applying a linear transformation to the sparse spreading blocks to produce linearly transformed sparse spreading blocks;
- wherein applying non-sparse spreading in the time domain based on the sparse spreading blocks to produce the set of non-sparse spreading blocks comprises applying non-sparse spreading to the set of linearly transformed sparse spreading blocks.

20. The non-transitory computer readable medium of claim 19 wherein applying a linear transformation comprises applying a discrete Fourier transform (DFT) having size J.

* * * * *

UNITED STATES PATENT AND TRADEMARK OFFICE
CERTIFICATE OF CORRECTION

| | | |
|---|---|---|
| PATENT NO. | : 11,070,245 B1 | Page 1 of 1 |
| APPLICATION NO. | : 16/999747 | |
| DATED | : July 20, 2021 | |
| INVENTOR(S) | : Sanjeewa Herath et al. | |

It is certified that error appears in the above-identified patent and that said Letters Patent is hereby corrected as shown below:

On the Title Page

Item [54], and in the Specification, Column 1, Lines 1-3, delete "SYSTEM AND METHOD FOR SINGLE-CARRIER MULTIPLE ACCESS TRANSMISSION" and insert -- SYSTEM AND METHOD FOR SINGLE-CARRIER MULTIPLE-ACCESS TRANSMISSION --

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*